(12) United States Patent
Ostrum et al.

(10) Patent No.: US 6,380,927 B1
(45) Date of Patent: Apr. 30, 2002

(54) DETERMINING THE POSITION OF A DETENTED OPTICAL ENCODER

(75) Inventors: Brett T. Ostrum, Edmonds; Greg S. Gibson, Bellevue; Lord Nigel Featherston; Ceasar de Leon, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/442,592

(22) Filed: Nov. 17, 1999

(51) Int. Cl.$^7$ .............................................. G09G 5/08
(52) U.S. Cl. ...................................................... 345/165
(58) Field of Search ................................. 345/163, 164, 345/165, 166, 156, 167, 161, 162; 74/471; 463/30, 37, 38, 36

(56) References Cited

U.S. PATENT DOCUMENTS

| | | | | |
|---|---|---|---|---|
| 5,557,440 A | * | 9/1996 | Hanson et al. | 345/163 |
| 5,748,181 A | * | 5/1998 | Fu et al. | 345/165 |
| 5,748,494 A | * | 5/1998 | Ko | 345/156 |
| 6,252,584 B1 | * | 6/2001 | Wu | 345/166 |

* cited by examiner

*Primary Examiner*—Chanh Nguyen
(74) *Attorney, Agent, or Firm*—Ronald M. Anderson

(57) ABSTRACT

Changes in the detent position of a detented control wheel used for the Z-axis in a pointing device are determined in a manner that avoids problems previously experienced. A detented wheel is coupled to an optical encoder that produces a quadrature output signal. A quadrature state table containing entries defining quadrature state change conditions that invoke position change indications is used to determine when transitions between detent positions are reported and includes provision for reporting transitions between detent positions even if quadrature states are missed. Also employed is a physical-to-logical quadrature state conversion scheme that enables the transition point between adjacent detent positions to be correctly determined within a controlled range relative to the adjacent detent positions, regardless of the physical quadrature state while the wheel is in a detent position. The invention also enables the use of unmatched photo-optic sets by combining a duty-cycle encoding scheme and feedback mechanism, and by providing a continuous readjustment throughout of sampling time during use of the pointing device. The duty-cycle encoding scheme is implemented by a microcontroller or logic device that processes the quadrature output signal.

37 Claims, 13 Drawing Sheets

| | Tmin | Tsample |
|---|---|---|
| SAMPLE # | TIME (µs) | TIME (µs) |
| 1 | 1.0 | 2.0 |
| 2 | 2.0 | 4.0 |
| 3 | 3.0 | 6.0 |
| 4 | 4.0 | 8.0 |
| 5 | 5.0 | 10.0 |
| 6 | 6.0 | 12.0 |
| 7 | 7.0 | 14.0 |
| 8 | 8.0 | 16.0 |
| 9 | 9.0 | 18.0 |
| 10 | 10.0 | 20.0 |
| 11 | 11.0 | 22.0 |
| 12 | 12.0 | 24.0 |
| 22 | 22.0 | 44.0 |
| 23 | 23.0 | 46.0 |
| 24 | 24.0 | 48.0 |
| 46 | 46.0 | 92.0 |
| 47 | 47.0 | 94.0 |
| 48 | 48.0 | 96.0 |
| 49 | 49.0 | 98.0 |
| 50 | 50.0 | 100.0 |

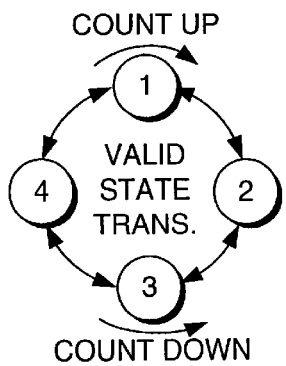
FIG. 3A (PRIOR ART)
| CHA | CHB | STATE |
|---|---|---|
| 1 | 0 | 1 |
| 1 | 1 | 2 |
| 0 | 1 | 3 |
| 0 | 0 | 4 |
FIG. 3B (PRIOR ART)
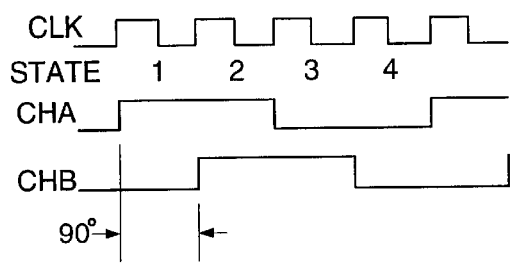
FIG. 3C (PRIOR ART)
| OLD QUAD | CURRENT STATE | NEW QUAD | NEW STATE | OUTPUT ON CHANGE |
|---|---|---|---|---|
| 10 | 1 | 11 | 2 | + |
| 11 | 2 | 01 | 3 | + |
| 01 | 3 | 00 | 4 | + |
| 00 | 4 | 10 | 1 | + |
| 10 | 1 | 00 | 4 | - |
| 11 | 2 | 10 | 1 | - |
| 01 | 3 | 11 | 2 | - |
| 00 | 4 | 01 | 3 | - |
FIG. 3D (PRIOR ART)

| OLD QUAD | CURRENT STATE | NEW QUAD | NEW STATE | OUTPUT ON CHANGE |
|---|---|---|---|---|
| 00 | 1 | 01 | 2 | + |
| 01 | 2 | 11 | 3 | |
| 11 | 3 | 10 | 4 | + |
| 10 | 4 | 00 | 1 | |
| 00 | 1 | 10 | 4 | |
| 10 | 4 | 11 | 3 | - |
| 11 | 3 | 01 | 2 | |
| 01 | 2 | 00 | 1 | - |

| OLD QUAD | CURR STATE | NEW QUAD | NEW STATE | OUTPUT ON CHANGE |
|---|---|---|---|---|
| 11 | DR | 11 | DR | 0 |
| 11 | DR | 01 | 1F | 0 |
| 11 | DR | 00 | 2R | 0 |
| 11 | DR | 10 | 3R | 0 |
| 11 | DF | 11 | DF | 0 |
| 11 | DF | 01 | 1F | 0 |
| 11 | DF | 00 | 2F | 0 |
| 11 | DF | 10 | 3R | 0 |
| 01 | 1F | 11 | DR | 0 |
| 01 | 1F | 01 | 1F | 0 |
| 01 | 1F | 00 | 2F | 0 |
| 01 | 1F | 10 | 3F | Z+ |
| 01 | 1R | 11 | DR | 0 |
| 01 | 1R | 01 | 1R | 0 |
| 01 | 1R | 00 | 2F | 0 |
| 01 | 1R | 10 | 3R | 0 |
| 00 | 2R | 11 | DR | Z- |
| 00 | 2R | 01 | 1R | Z- |
| 00 | 2R | 00 | 2R | 0 |
| 00 | 2R | 10 | 3F | 0 |
| 00 | 2F | 11 | DF | Z+ |
| 00 | 2F | 01 | 1R | 0 |
| 00 | 2F | 00 | 2F | 0 |
| 00 | 2F | 10 | 3F | Z+ |
| 10 | 3R | 11 | DF | 0 |
| 10 | 3R | 01 | 1R | Z- |
| 10 | 3R | 00 | 2R | 0 |
| 10 | 3R | 10 | 3R | 0 |
| 10 | 3F | 11 | DF | 0 |
| 10 | 3F | 01 | 1F | 0 |
| 10 | 3F | 00 | 2R | 0 |
| 10 | 3F | 10 | 3F | 0 |

*FIG. 15*

| CURRENT STATE | Z COUNTS? | TIMER OVERFLOW (5s) | CQ = LQ | CQ = '00' | LB[CP] | LB[LP] | NEXT STATE |
|---|---|---|---|---|---|---|---|
| WAITING FOR Z COUNTS | 0 | X | X | X | 1 | 0 | INCREMENT TMIN VALUE |
| WAITING FOR Z COUNTS | 0 | X | X | X | 1 | 1 | WAITING FOR Z COUNTS |
| WAITING FOR Z COUNTS | 0 | X | X | X | 0 | X | WAITING FOR Z COUNTS |
| WAITING FOR Z COUNTS | 1 | X | X | X | X | X | RESET TIMER |
| INCREMENT TMIN VALUE | X | X | X | X | X | X | WAITING FOR Z COUNTS |
| WAIT UNTIL WHEEL STOPS | 0 | 0 | X | X | X | X | WAIT UNTIL WHEEL STOPS |
| WAIT UNTIL WHEEL STOPS | 0 | 1 | 0 | 0 | X | X | UPDATE LAST QUAD |
| WAIT UNTIL WHEEL STOPS | 0 | 1 | 1 | 0 | X | X | WAIT FOR Z COUNTS |
| WAIT UNTIL WHEEL STOPS | 0 | 1 | 1 | 1 | X | X | UPDATE CURRENT DETENT |
| WAIT UNTIL WHEEL STOPS | 0 | 1 | X | 1 | X | X | WAIT FOR Z COUNTS |
| WAIT UNTIL WHEEL STOPS | 1 | X | X | X | X | X | RESET TIMER |
| UPDATE CURRENT DETENT | X | X | X | X | X | X | UPDATE LAST QUAD |
| UPDATE LAST QUAD | X | X | X | X | X | X | WAITING FOR Z COUNTS |
| RESET TIMER | X | X | X | X | X | X | WAIT UNTIL WHEEL STOPS |

*FIG. 19*

DETERMINING THE POSITION OF A DETENTED OPTICAL ENCODER

FIELD OF THE INVENTION

The present invention generally concerns a method and apparatus for determining a shaft position using an optical encoder, and in particular, concerns the determination of the rotational position of a detented optical encoder shaft in a computer input device.

BACKGROUND OF THE INVENTION

Pointing devices, such as computer mice and trackballs, are used to provide user input to a computer program and to control applications, and are well known in the art. Such pointing devices enable a user to move a cursor on a display screen and are fundamental to programs and operating systems that employ a graphical user interface, such as Microsoft Corporation's WINDOWS™ and Apple Corporation's MACINTOSH™ operating systems. In a typical pointing device, a ball is rotated in the housing of the device, either directly by the user's fingers, or by movement of the device over an underlying surface or pad. Depending upon its direction of rotation, the rotating ball in turn causes one or both of a pair of encoder shafts in the housing to rotate. The encoder shafts rotate about a pair of orthogonal axes, i.e., the "X" and "Y" axes, in response to components of the ball's rotation along those axes. As the encoder shafts rotate, the corresponding encoders produce signals that indicate the device's incremental motion along these orthogonal axes. These signals are processed by a microcontroller or other logic in the pointing device, which produces a corresponding stream of digital values indicative of a position of the device relative to the X and Y axes. These displacements are passed to a driver program executing on the computer to which the pointing device is attached. The driver program also receives other input signals from the pointing device, including a signal indicative of the state of control buttons on the device. The relative position data and the state of the control buttons are input to a computer program (or the operating system), which processes the information, causing a predefined action to occur. For example, many operating systems move a cursor displayed on a monitor or other display screen in response to a user's movement of a pointing device. The X and/or Y movement of the cursor on the display screen is a function of the motion of the ball (or device) along its respective X and/or Y axes.

In recent years, mouse manufacturers have added a third input axis to their products, commonly known as the "Z" axis. Originally developed by the Microsoft Corporation for use with its WINDOWS™ operating system, this Z-axis control on the mouse is primarily used for scrolling within a document or in a displayed window and is typically implemented using a detented wheel (the Z-wheel) that is coupled to a rotatable shaft. An encoder monitors rotation of the Z-wheel shaft by a user. Detents on the rotational motion of this wheel provide tactile feedback regarding the extent of the rotation of the wheel and enable a user to scroll a document or data display in consistent increments specified by the user, such as a predetermined number of lines/detent, or a screen/detent. The Z-wheel is typically mounted vertically and is disposed toward the front of a mouse so that it can be readily turned with a user's index or middle finger. The detent positions are typically spaced at increments of about 20°.

In order to obtain a desired level of performance, the output signal produced by the Z-axis encoder should accurately correspond to the number and direction of detent positions through which the user rotates the Z-wheel. For example, if a user rotates the Z-wheel through five detent positions in a forward direction (rotating the top of the Z-wheel toward the front of the mouse), this movement should be reflected in the corresponding control action applied by the computer program, e.g., by the program scrolling forward in a document displayed on a monitor through five of the scrolling increments/detent previously selected by the user.

Several techniques have been implemented in prior art Z-wheel mice to address this performance requirement. One solution is to use a mechanical encoder with a built-in detent mechanism. In this type of device, a mechanical detent is closely coupled with the encoder that produces an electrical output signal, which satisfies the foregoing performance requirement. However, mechanical encoders of this type generally cost more than may be desired in a product that must compete on price as well as performance. Therefore, a less-expensive optical encoder scheme is preferable for accurately detecting rotation of the Z-wheel through successive detent positions.

Optical encoders are commonly used to detect the motion and/or position of a member, as it moves either linearly or rotationally. Two classes of optical encoders are incremental encoders, and absolute encoders. Incremental rotary encoders are suitable for use in a mouse. Ideally, an incremental encoder produces a pair (two channels) of square wave signals that are approximately 90° out of phase, and this type of output signal is thus commonly referred to as a quadrature output. The quadrature output is processed to determine the extent of rotation of an element (such as a wheel) monitored by the encoder, and the direction of the element's rotation.

The primary components of a typical optical encoder (prior art) are shown in FIGS. 1 and 2, and include a codewheel or code disk 10, an emitter 12, and an integrated detector circuit 14. The codewheel generally comprises a plurality of equally-spaced teeth 16, forming slots 18, which may be fully enclosed, or it may be fabricated using a clear plastic or glass disk imprinted with a radially-spaced pattern of lines, commonly called a "mask." Emitter 12 typically comprises an LED 20, which emits light rays 21 that are collimated into a parallel beam by a lens 22. Integrated detector circuit 14 is disposed opposite the emitter and typically comprises at least two photodetectors 24 (as shown in FIG. 2), or two sets of photodetectors (as shown in FIG. 1), noise reduction circuitry 26, and comparators 28. Suitable photodetectors include photodiodes and phototransistors. The set of components comprising the emitter and photodetectors used in an optical encoder is commonly referred to as the encoder's "photo-optics."

The codewheel is disposed relative to the emitter and integrated detector circuit so that when it is rotated, its slotted or lined portion moves between the emitter and integrated detector circuit. The light beam passing from the emitter to the integrated detector circuit is thus interrupted by the part of the codewheel between the pattern of slots or by the radial lines on the codewheel. Any portion of the light beam that is not blocked by the codewheel (or the lines that are imprinted) is detected by the photodetectors. The photodetectors typically produce an analog output signal that is proportional to the intensity of light they detect. In general, the output signal produced by each photodetector as the codewheel is turned at a constant rate is sinusoidal. The photodetectors are arranged in a pattern that is a function of the radius and slot or line density of the codewheel, so as to produce a quadrature output.

In the embodiment shown in FIG. 1, the photodetectors are spaced such that a light period (i.e., when light passes through the codewheel) on one pair of photodetectors corresponds to a dark period (i.e., when the codewheel blocks the light) on an adjacent pair of photodetectors, thereby producing two complementary outputs for each channel. The photodetector outputs are processed by the noise reduction circuitry, which removes extraneous noise. The resulting four signals are then evaluated by the comparators (one comparator for each complementary pair of signals), producing a digital waveform corresponding respectively to the encoder output for channels A and B. The digital waveform has voltage levels corresponding to a logic level zero and a logic level one. If the encoder wheel is turned at a constant angular rate, the output signals on channels A and B will be similar to the waveforms shown in FIG. 3C, wherein the digital waveform of channel A is approximately 90° out of phase (in quadrature) with that of channel B. In actual practice, the waveforms are not perfectly square waves due to signal propagation delays, switching latencies, etc.; however, they approximate square waves.

The quadrature output of an encoder can be evaluated to determine the present state of the encoder and the direction that the encoder shaft is being turned or is moving. FIG. 3B shows a typical state table corresponding to a full quadrature encoding scheme, and the corresponding state transitions are shown in FIG. 3A. The state of the encoder is dependent on the logic value of each channel. For example, if the logic values of channels A and B are respectively 1 and 0 (represented simply as "(10)"), the state is 1. By examining changes in the state of the encoder, it is possible to determine the present position of the encoder by integrating its incremental motion. A common scheme used to perform this task is shown in FIG. 3C, wherein the state is evaluated at each falling edge of a clock input signal. The direction of rotation of the encoder wheel can also be determined by determining which channel leads the other, e.g., A leading B indicates clockwise rotation of the wheel, while B leading A indicates counterclockwise rotation of the wheel.

FIG. 3D shows a state transition table corresponding to the full quadrature transition states discussed above. The state transition table indicates when a transition is reported based on a sensed change in the position of the encoder wheel. In the case of full quadrature encoding, every change in state on either channel produces either a "+" or "−" change in the output produced by processing the channels. Put another way, there are two state changes for each change in the output signal on a given channel. As a result, this scheme multiplies the resolution of the encoder wheel by four. For an encoder wheel with X teeth, the resolution with which rotation of the wheel can be monitored is four times X, and this type of quadrature encoding is referred to as 4X encoding.

The foregoing optical encoder has several drawbacks when used in a mouse or trackball. A primary problem is that it is too expensive. Each photodiode has a significant cost, and the noise reduction circuitry and comparators also add to the expense of the encoder. Another problem is that the integrated detector circuit portion of the encoder generally takes up too much space. Additionally, the level of precision required for an input axis on a mouse is much lower than the level of precision required in other applications that typically often employ optical encoders of the foregoing design, such as motion controllers, robotics, etc.

In order to address the size and cost limitations of encoders suitable for use in a mouse, engineers developed an optical encoder scheme that requires fewer components and is much less costly to manufacture. An example of such a prior art scheme is shown in FIG. 4. As shown therein, the detection circuit has been reduced to a pair of phototransistors 30, each of which produces an analog output signal applied respectively to a non-inverting Schmitt trigger 32. The Schmitt triggers are used to minimize the effects of extraneous noise in the raw signals provided by the phototransistors. Optionally, other types of comparator circuits can be used in place of the Schmitt triggers. The output signals of the Schmitt triggers are input to a microcontroller, which processes the signals on channels A and B using a special duty-cycle control algorithm to generate a digital waveform in quadrature, which is further processed by the microcontroller to determine the incremental motion of the encoder wheel. The output from the microcontroller is then passed through a serial communication link to a computer (e.g., through an RS-232 serial port, a universal serial bus (USB) port, or a PS/2 port). A driver in the operating system (or in an application program) processes the output from the microcontroller to control the display of a cursor on the computer monitor screen in response to the movement of the mouse Z-wheel.

As might be expected, the waveforms produced by the phototransistor/Schmitt trigger/duty-cycle control algorithm scheme of FIG. 4 are not as accurate and clean as the waveforms produced by the detection circuit of FIG. 1. Due to the lower accuracy of the waveforms, there is a higher probability that a logic level change (a transition between a high and low voltage level or vice versa) on a channel might be missed, or that a false logic level change might be indicated. Either of these situations would cause the sensed movement of the encoder wheel to differ from the actual movement of the wheel, and the movement of the Z-wheel would thus be inaccurately reflected in the control action implemented by the computer. To overcome this problem, a different state transition scheme was developed, as shown in FIGS. 5A and 5B (prior art). In this transition state scheme, there are two electrical state changes required for each detent position of the encoder wheel. This scheme reduces the impact of missed state transitions and false signals, but is still susceptible to many problems when used with a detented Z-wheel control.

A primary problem that occurs in detented encoders that employ optical encoders to detect motion is that the mechanical detent positions may not always be or remain synchronized relative to the occurrence of valid opto-electrical state changes. This is typically caused by variations in the dimensions, performance, and location of the various parts that make up an assembled encoder, wear and fatigue problems that occur over the lifetime of the device, and noise problems due to electrostatic discharge and/or ambient lighting conditions. Such is the case with the prior art device of FIG. 2.

As shown in FIG. 2, a common detent mechanism employs a leaf spring 50 with a protrusion 52 on one end that applies a bias force against evenly-spaced longitudinal slots 54 formed in a portion of a rotatable shaft 56. As the shaft is rotated, the protrusion, acting under the biasing force of the spring, moves in and out of successive slots, which flexes the spring back and forth, thereby creating a detent action. The even spacing of the slots in the shaft results in a user feeling a plurality of evenly-spaced detented positions as the user rotates a wheel 58 that is mounted on the shaft.

The force required to move the wheel from one detent position to the next varies with the angular position of the wheel as it is rotated between the detent positions. FIG. 6 illustrates the relative displacement of the protrusion 52 with respect to the slots 54 as the shaft 56 is rotated. The rotational force or torque necessary to achieve this displacement is approximated by the derivative of this displacement curve. For instance, when the wheel is disposed at a detent position, it requires relatively little force to rotate it away from that detent position (i.e., the slope of the curve immediately adjacent the detent position is relatively flat on both sides), while a substantially larger amount of rotational force is required to turn the wheel to an adjacent detent position, as indicated by the vertical portions of the curve.

Under optimal circumstances, there should be a tendency for the Z-axis wheel to always return to a detent position if a user releases the wheel (stops applying a rotational force to the wheel), regardless of the rotational angle of the wheel when it is released. However, as shown in the region enclosed by the ellipse in the graph of FIG. 6 and as indicated by the corresponding arc in FIG. 7, there are areas between detent positions, known as "balance areas," where the wheel will hang and not return to a detent position if it is released. (If the wheel is released outside of one these balance areas, the position of the wheel will always move to the nearest detent position, as is desired.) Due to friction, the balance area for rotation of the wheel in a forward direction is not always coincident with the balance area for rotation of the wheel in a reverse direction.

FIG. 6 also illustrates another problem that can be encountered with a detented optical encoder, known as "bounce back." Bounce back occurs when a user rolls the wheel forward quickly and then releases the wheel just prior to passing through a balance point to the next detent position. If the wheel has been rolled forward rapidly, it is possible for angular momentum to cause the wheel to continue rolling for a short duration in its present direction after the user has released the wheel. The wheel will slow down, stop, and then return to the previous detent position. If the electrical system senses a transition point prior to the direction of wheel rotation self-reversing, the result will be that the last electrical count is reported in a direction opposite that in which the user was rolling the encoder wheel. This problem will be more clearly understood from the following explanation.

With reference to FIG. 6, at position A, the encoder wheel is moving forward and a forward transition is reported, as indicated by a "+." At position B, the encoder wheel is moving forward and a second forward transition is reported. Between positions B and C, the user releases the encoder wheel, but the angular momentum causes the encoder wheel to continue rolling forward. At position C, the encoder wheel is moving forward very slowly, but a forward transition is reported. Just after position C, the encoder wheel stops, but changes direction and returns to the previous detent position. However, at position D, the encoder wheel is rolling backward, and a backward transition is reported. At position E, the encoder wheel comes to rest. As a result of the preceding scenario, an extra forward transition and an extra backward transition are registered by the encoder, even though the user did not intend the transitions C+ and D− to be registered. These erroneous transition registrations can be quite bothersome, especially if a user is working on a relatively slow computer on which a lag between the time a scrolling request is received and the time that the display or data actually scrolls is very evident. In this case, the user would be forced to wait for the false forward and backward transitions to be implemented on the display before continuing to work on the document or data.

Ideally, the reporting of a transition state change indicating a user movement of the wheel to a new detent position (called the transition point) should occur just after passing the balance area. At this point, it is certain that the encoder wheel will move to the next detent position if the user releases the wheel, and bounce back cannot occur. In addition, it is preferable that the reported transition point (i.e., the angle at which the encoder wheel is when a transition is reported) on both a forward and reverse encoder wheel motion occurs at repeatable positions.

It is not practical to achieve the foregoing desires with the prior art designs discussed above, due to the part and assembly variances commonly associated with the manufacture of large lots of product. For example, a variation of a mere 0.001" in the location of the protrusion on the leaf spring results in a 0.5-degree (ARCTAN [0.001/0.117]) shift in the transition angle. In addition, the prior art design presents numerous situations where mechanical tolerance stack-up due to part tolerance variation is considered. The variation in the dimensions of the parts comprising the encoder assembly and/or the variation in the assembled position of these parts can cause the reported transition points to be out of tolerance relative to the detent positions. In order to meet a required performance requirement, the tolerances on the parts that comprise the prior art assembly would have to be so tight that the cost of this assembly would be prohibitive, particularly for use in the Z-wheel shaft encoder assembly of a pointing device.

Furthermore, in the prior art design, the location of some of the components may change over time, due to creep and/or wear. For example, the leaf spring constantly applies a lateral force to the shaft, which is transferred to a bearing surface in a support bracket (not shown) that provides a rotatable support for the shaft. As a result, this transferred lateral force produces a bending moment about the base of the support bracket, which eventually may cause the location of the bearing to creep (i.e., shift) relative to the rest of the assembly. As a result, the location of the codewheel relative to the emitter and photodetector may change, causing the transition point to shift as well. Another problem occurs as a result of wear on the contacting surfaces and/or fatigue in the spring. As a result, the mechanical accuracy of the detented positions relative to the encoder output signal may change over time. Because of these and other problems, exemplary angular ranges 90 and 92 shown in FIG. 8 are specified to define the acceptable range for the transition point to occur relative to the angular position of the wheel between adjacent detents.

An additional problem associated with detented optical encoders is known as an "odd/even" error. This error arises in an encoder for a wheel that does not report transitions in the same location from detent to detent. For even detents, the transitions may occur early in the force curve, while for odd detents, the transitions occur late, which is due to the electrical system not properly adjusting to the output gain and/or position of the photodetectors. Using the quadrature transition table of FIG. 5B, the electrical system reports counts whenever it sees a transition on a single phototransistor. A transition is detected when a processed phototransistor output changes from "0" to "1." The next time that a transition is detected (if the wheel is moving in the same direction) will be when the output signal changes from "1" to "0." For a very sensitive photodetector system, all "0 to 1" transitions will occur early (i.e., the photodetector only requires ~25% exposure to light to output a '1') and all "1 to 0" transitions will occur late (i.e., it requires ~75% of the photodetector to be occluded to output a '0'). The opposite is true for a photodetector pair that has relatively low sensitivity. Due to this problem, the specified photodetector pair performance must be higher than desired, leading to the rejection of many vendor-supplied photodetector pairs during manufacturing of the pointing device.

Still another problem with detented optical encoders is caused by jitter, which occurs when the particular orientation of the various components of the encoder relative to one another, combined with the system's electrical noise, cause the output produced on one of the channels to fluctuate about the threshold voltage, producing an indeterminate position indication. For instance, due to jitter, a quadrature sequence of 00=>01=>00=>00=>01 may be reported by a conventional encoder as a transition of +1, −1, etc., when in actuality, the Z-axis wheel is not moving.

It would therefore be desirable to provide a detented optical encoder control device that avoids the problems of the prior art devices discussed above. Such a device should eliminate or minimize the effects of bounce back, should minimize the effect of the odd/even error, and should enable the use of both high and low sensitivity photo-optic components, as well as unmatched photo-optic sets without concern for producing jitter or erroneous results.

SUMMARY OF THE INVENTION

One aspect of the present invention is directed to a method that addresses the foregoing problems when determining the position of a detented control wheel and is suitable for use in a pointing device. Through the use of a novel quadrature state change table and a physical-to-logical quadrature state conversion process, a transition point is reported only after passing a balance point, thereby minimizing or eliminating the effect of bounce back. The quadrature state change table employed also provides a position change indication when the detented control wheel is moved between adjacent detent positions even if one of the quadrature states that would normally be required to be detected to invoke the position change indication is missed. The method also enables unmatched photo-optic sets to be used by combining a duty-cycle encoding scheme and a feedback mechanism that provides for continuous readjustment throughout the lifetime of the pointing device.

In accord with the method, a change is determined in a detent position of a detented wheel operatively coupled to an optical encoder that produces a quadrature output signal. The quadrature output signal includes a first, a second, a third, and a fourth quadrature state that change as the detented wheel is rotated in a forward or a reverse direction between successive detented positions. The method includes the step of monitoring and processing the quadrature output signal from the optical encoder as the detented wheel is rotated; the quadrature output signal that is processed comprises a plurality of successive quadrature states. Quadrature state change conditions are defined that invoke position change indications corresponding to a change in the detent position. In each of the forward and reverse directions, there exists a single predefined quadrature state change condition between a predefined pair of adjacent quadrature states that invokes a position change indication corresponding to the direction. In addition, the quadrature state change conditions compensate for a missing quadrature-state change in detecting a change in detent position. Position change indications are output, based on changes between successive quadrature states and the quadrature state change conditions that are defined, so as to provide an indication of the rotation direction and the detent position of the detented wheel.

The step of defining the quadrature state change conditions preferably comprises the step of creating a quadrature state table that comprises a plurality of entries defining the quadrature state change conditions. Each entry in the quadrature state table comprises a state change between one of the first, second, third, or fourth quadrature states and another quadrature state, and includes an indication of whether the quadrature state change corresponds to the forward or the reverse direction of wheel rotation. The single predefined quadrature state change condition invokes a position change indication for the forward direction when a change between the second quadrature state and the third quadrature state occurs. The quadrature state table further includes entries indicating a position change in the forward direction that compensate for missed quadrature state changes, such that a position change in the forward direction is indicated when the quadrature state changes from the second quadrature state to the fourth quadrature state, or from the first quadrature state to the third quadrature state.

Similarly, in the quadrature state table, there is an indication of whether the quadrature state change corresponds to the forward or the reverse direction of wheel rotation. The single predefined quadrature state change condition invokes a position change indication for the reverse direction when a change between the second quadrature state and the first quadrature state occurs. Also, the quadrature state table includes entries indicating a position change in the reverse direction compensating for missed quadrature state changes, such that a position change in the reverse direction is indicated when the quadrature state changes from the third quadrature state to the first quadrature state, or from the second quadrature state to the fourth quadrature state.

The fourth quadrature state corresponds to the quadrature output signal that was processed when the detented wheel is in a detent position, for either of the preceding cases that compensate for missing quadrature states. A distinction is made between physical and logical quadrature states. The quadrature output signals from the optical encoder that are monitored and processed comprise physical quadrature states, while the plurality of entries in the quadrature state table defining the quadrature state change conditions comprise logical quadrature states. The optical encoder outputs a detent physical quadrature state when the detented wheel is in a detent position. The method thus further includes the step of determining to which of the first, second, third, or fourth quadrature states the detent physical quadrature state corresponds. The physical quadrature state is converted to a logical quadrature state so that when the detented wheel is rotated between adjacent detent positions, a position change indication is output within a predefined range of rotation relative to the adjacent detent positions. Specifically, a position change indication is normally output indicating a change to an adjacent detent position after three logical quadrature state changes are traversed.

The step of determining to which of the first, second, third, or fourth quadrature states the detent physical quadrature state corresponds comprises the step determining an elapsed time between successive quadrature state changes. If the elapsed time exceeds a predetermined threshold, the physical quadrature state is recorded, whereupon if the physical quadrature state remains the same for another predetermined elapsed time, the detent physical quadrature state is set equal to the physical quadrature state. In addition, the algorithm prevents the balance point from being misinterpreted as the detent position (since the wheel could stop there indefinitely) by using a priori knowledge of the mechanical system.

The step of converting from the physical quadrature states to the logical quadrature states is preferably implemented through the use of a lookup table. The lookup table lists the four quadrature states, each quadrature state having an index value based on a location of that quadrature state within the list, and defines a logical detent quadrature state. The step of converting from physical quadrature states to logical quadrature states further comprises the step setting an index lookup equal to the physical detent quadrature state. A quadrature state in the lookup table having an index value equal to the index lookup is identified. A detent index of the quadrature state in the lookup table corresponding to the logical detent quadrature state is then determined, and a logical quadrature index is determined as a function of the quadrature state that was identified and the detent index. The quadrature state in the lookup table having an index value equal to the logical quadrature index is identified and set equal to the logical quadrature state.

Another aspect of the present invention is directed to a user input control that includes elements carrying out functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 1:
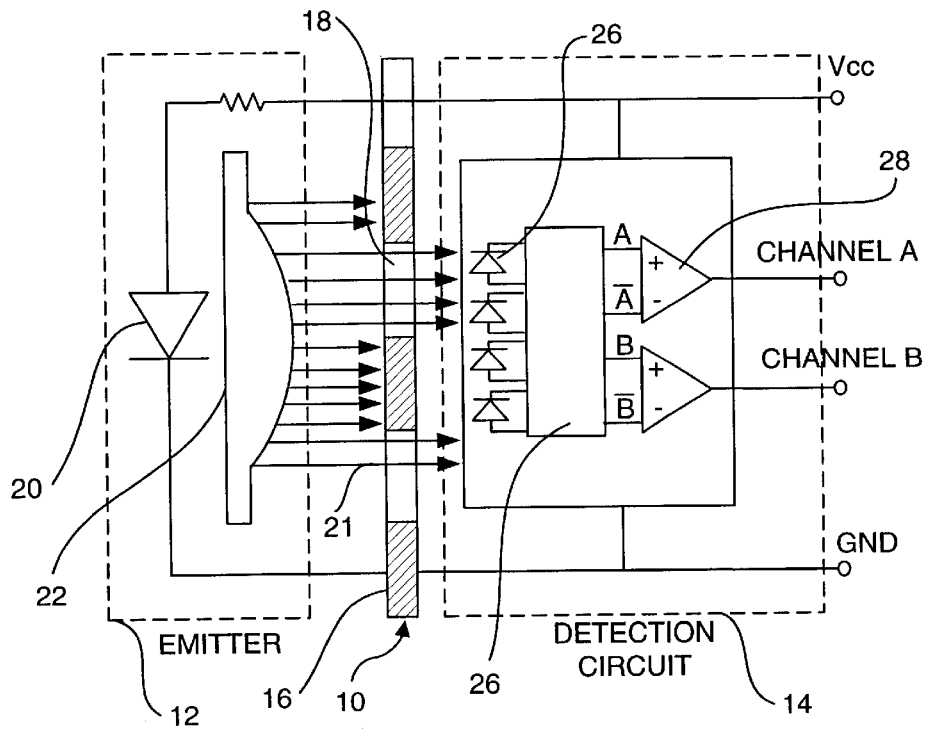
FIG. 1 is a schematic diagram of a conventional prior art optical encoder that incorporates four photodetectors.
Figure 4:
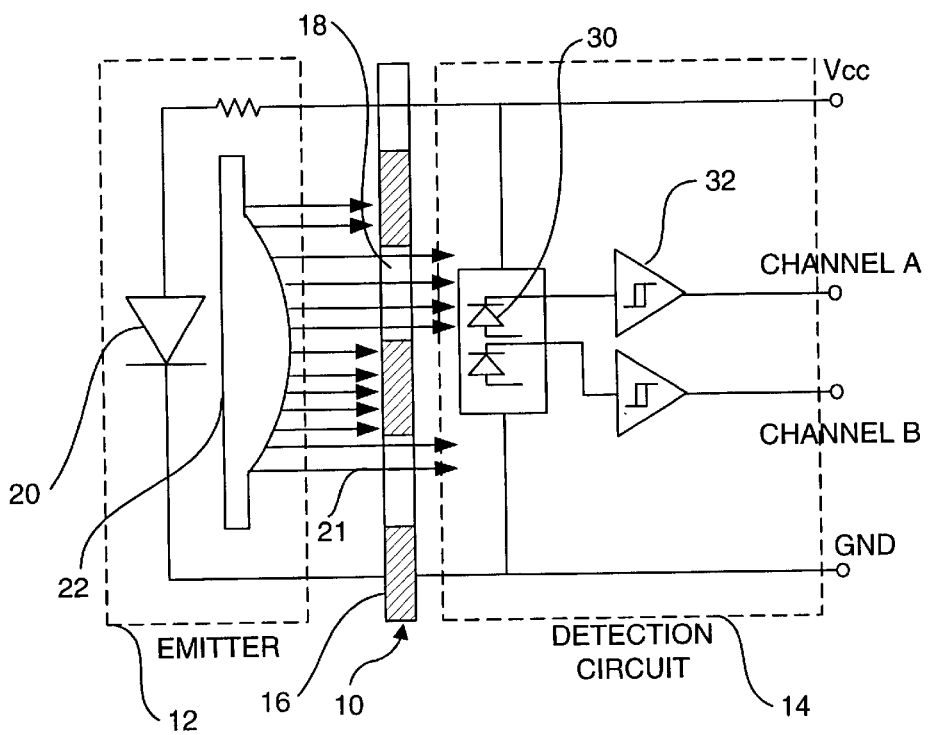
Figures 2, 14:
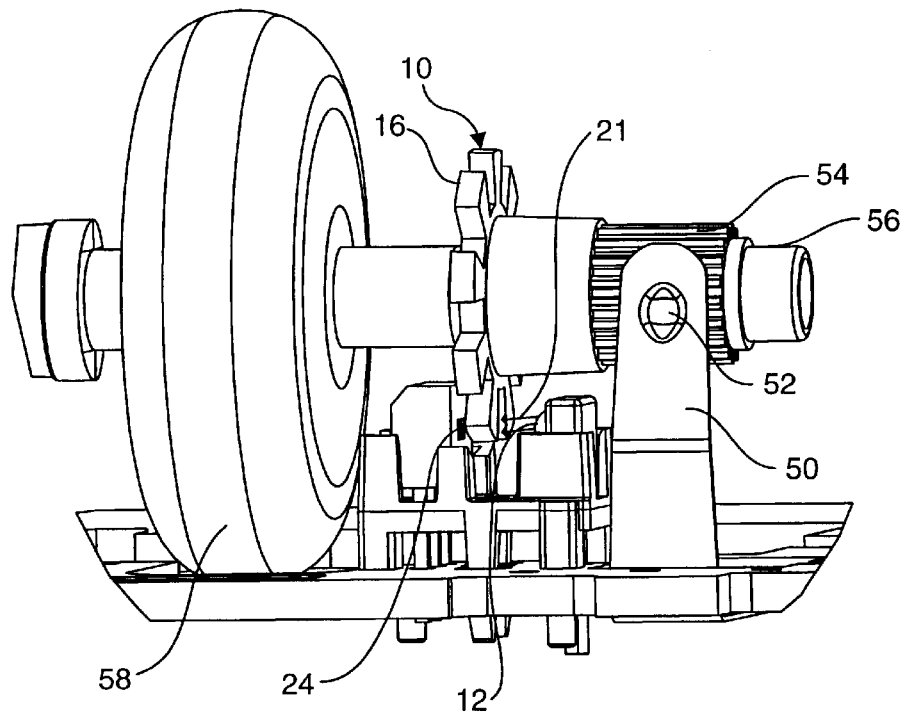
FIG. 2 is an isometric view of an assembly comprising the primary components of a prior art detented optical encoder.
Figures 5A, 5B:
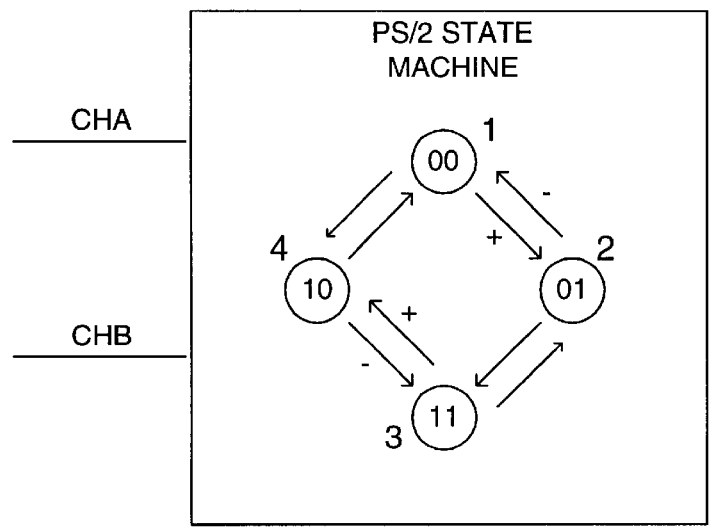
Figure 6:
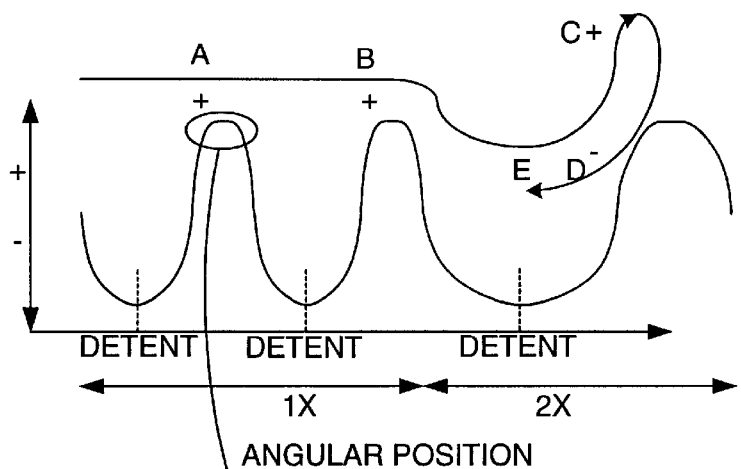
Figure 7:
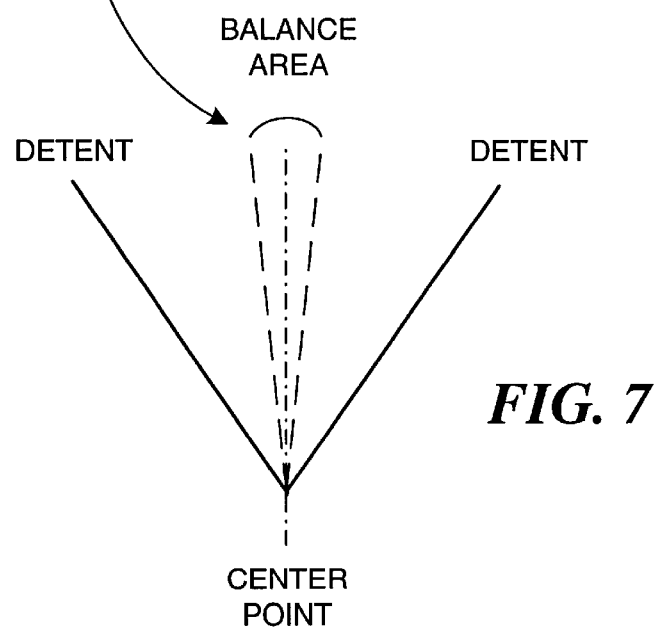
Figure 8:
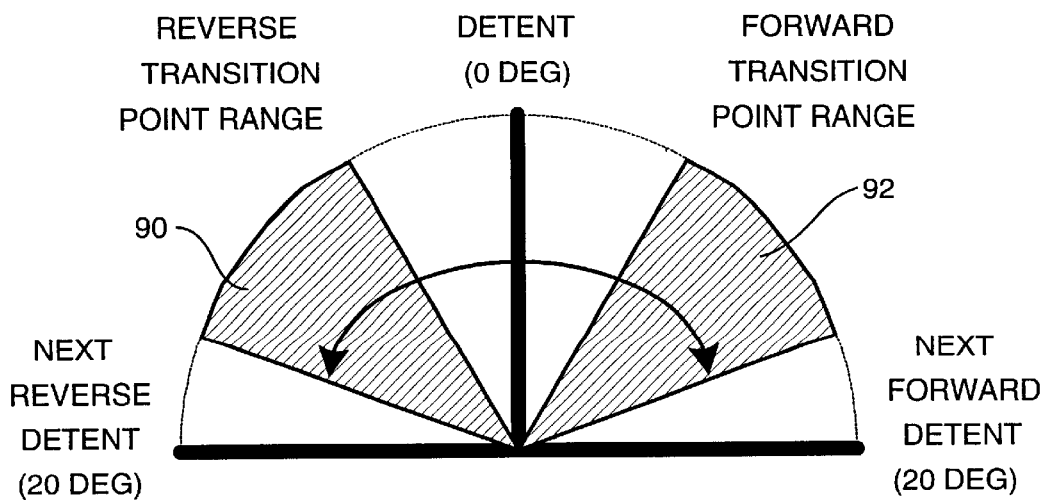
Figure 9:
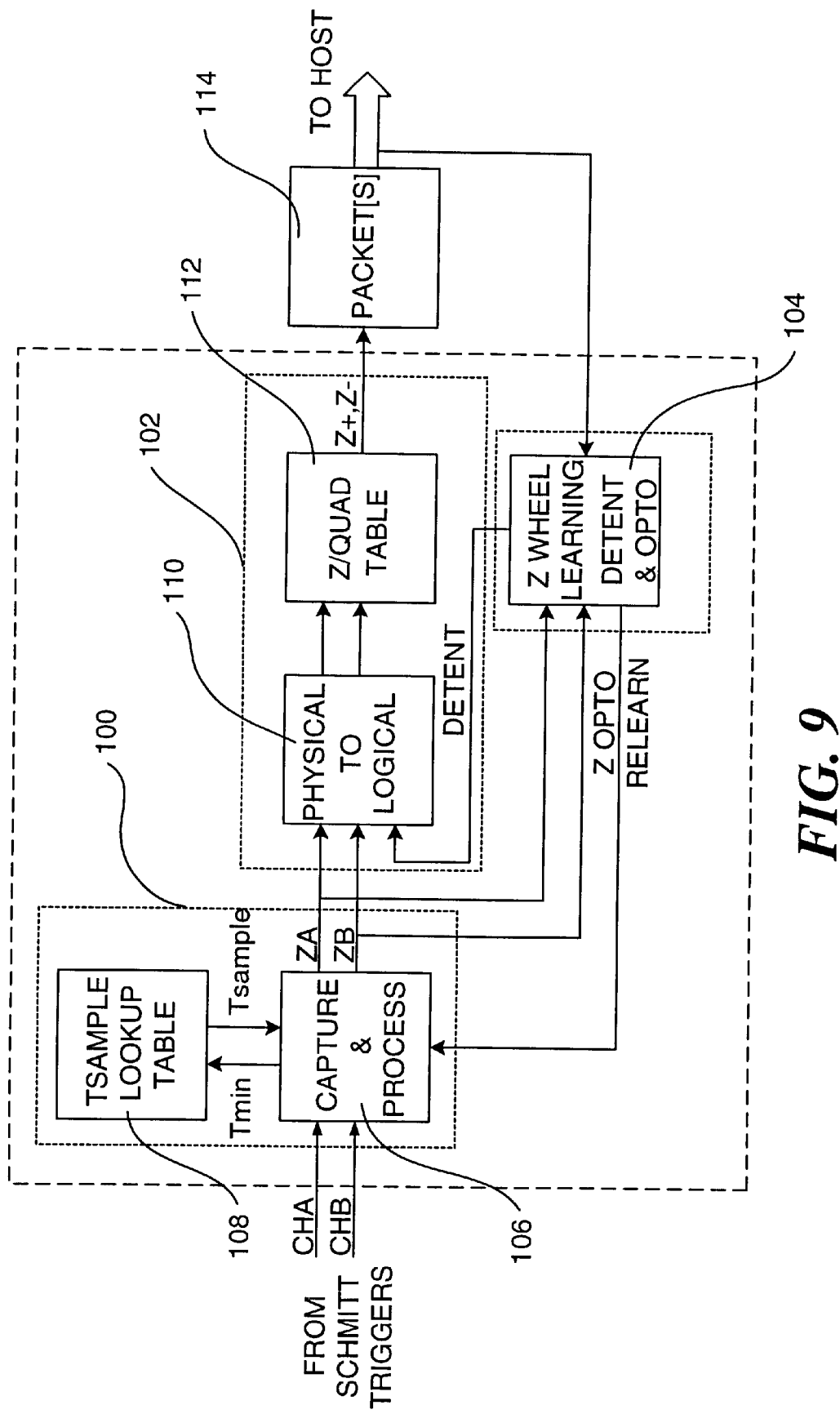
Figure 10:
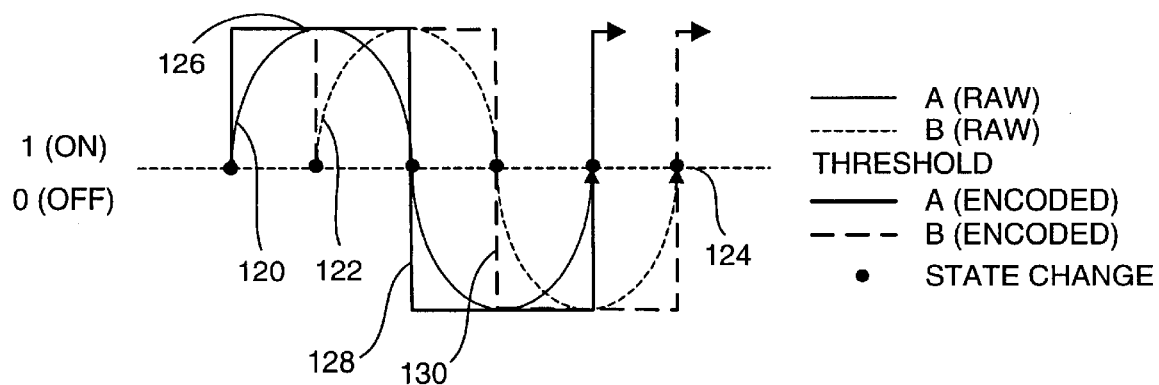
Figure 11:
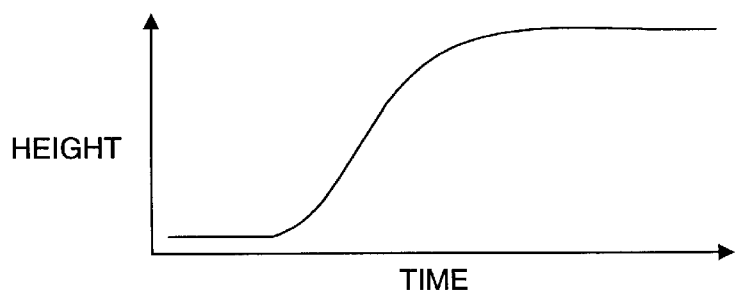
Figure 12:
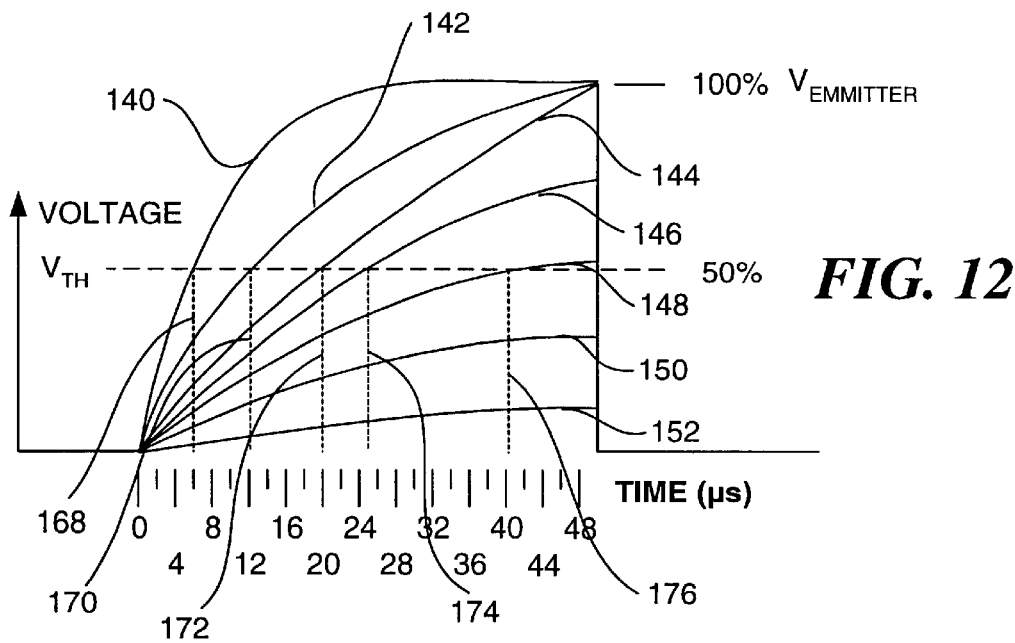
Figure 13:
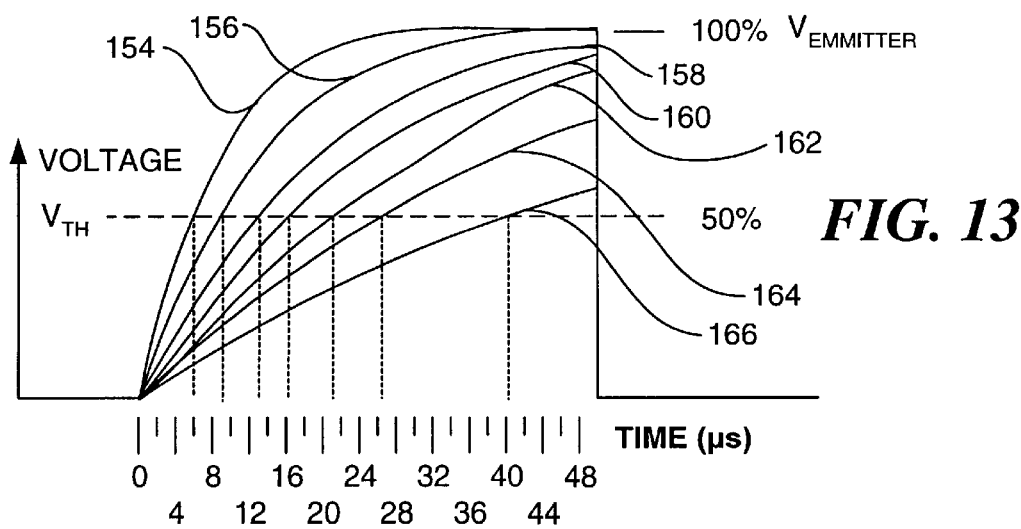
Figure 16:
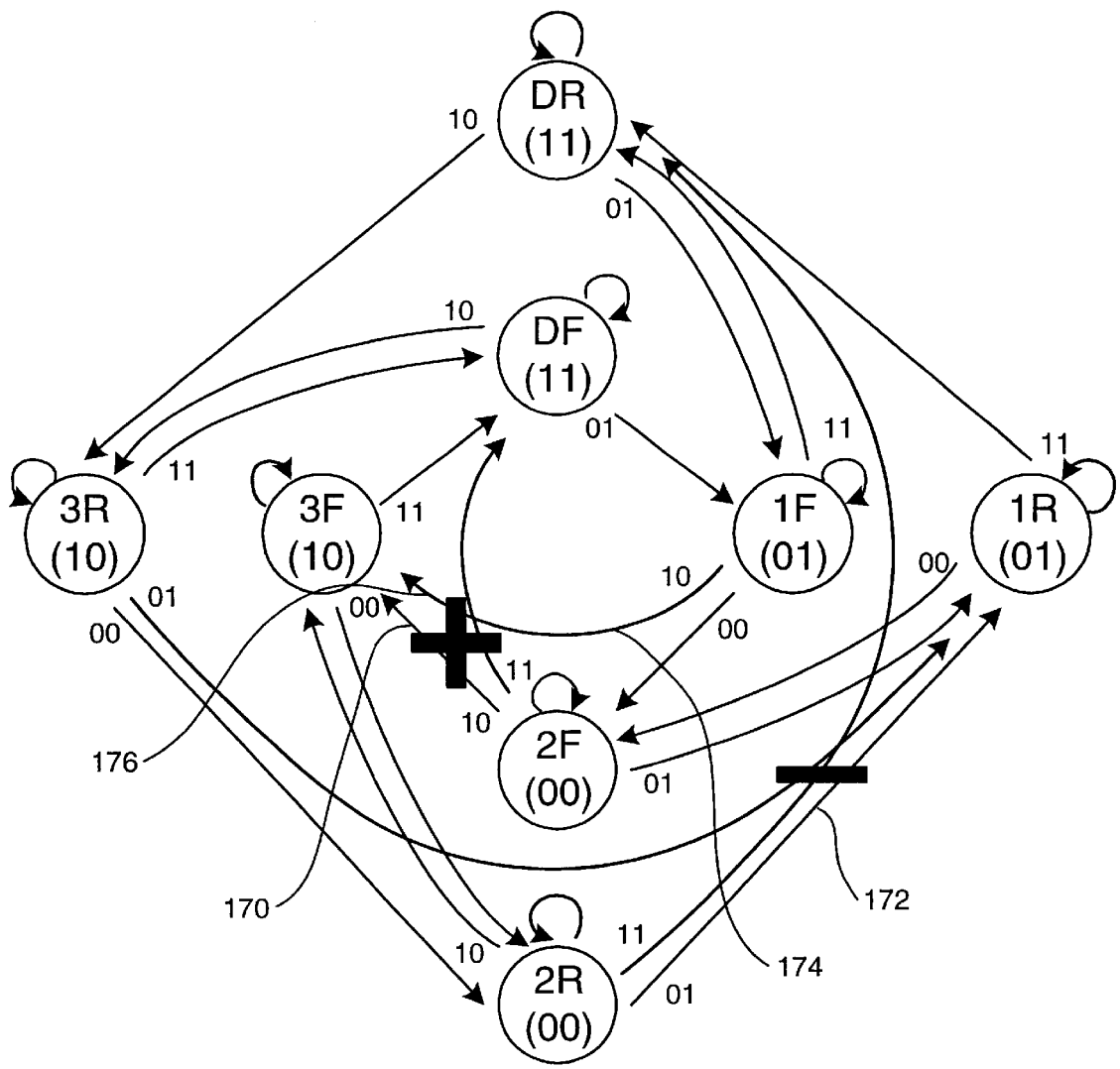
Figure 17:
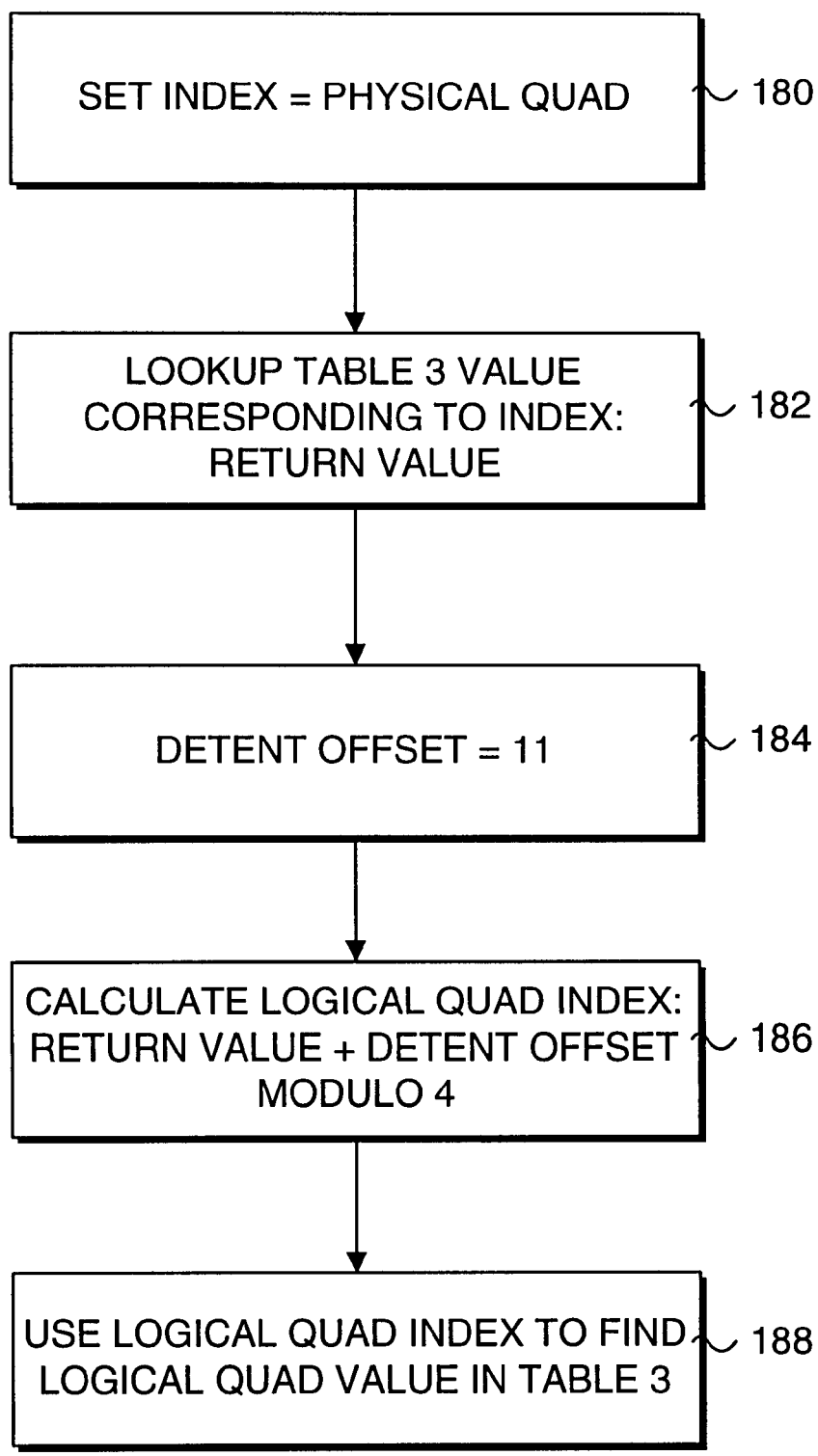
Figure 18:
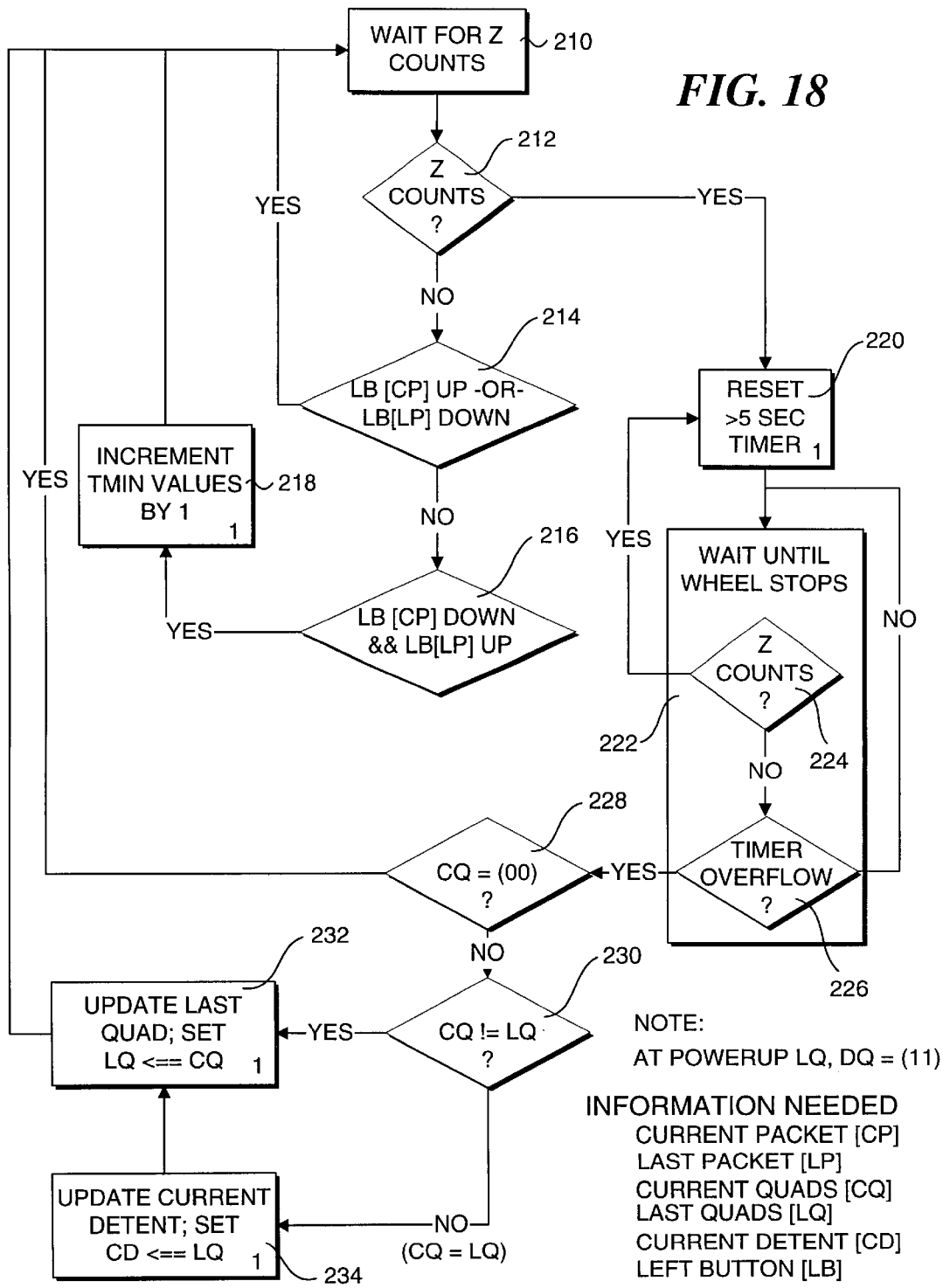

FIGS. 3A and 3B respectively show a state transition diagram and its associated state table corresponding to a conventional full quadrature encoding scheme used in the prior art;

FIG. 3C shows a prior art scheme for evaluating the states of a conventional quadrature signal;

FIG. 3D shows a prior art transition state table corresponding to a conventional 4X quadrature encoding scheme;

FIG. 4 is a schematic diagram of a low-cost optical encoder (prior art) that is suitable for use in the present invention;

FIG. 5A is a state diagram corresponding to a prior art 2X quadrature encoding scheme used with the optical encoder of FIG. 4;

FIG. 5B is a prior art transition state table corresponding to the state diagram of FIG. 5A;

FIG. 6 is a force curve corresponding to a relative level of force vs. angle encountered when turning a detented wheel through a plurality of adjacent detents;

FIG. 7 is a diagram illustrating a balance area that may exist between two adjacent detents;

FIG. 8 is a diagram specifying an exemplary allowable angular range for the reporting of a transition point between detents;

FIG. 9 is a block diagram illustrating the primary components of the signal processing used in the present invention;

FIG. 10 is a signal graph showing the raw sinusoidal output signals from an optical encoder and the corresponding digital quadrature signals;

FIG. 11 is a graph of the height of water versus time used for an analogy illustrating the output charge generated by a phototransistor;

FIG. 12 is a voltage versus time graph illustrating the output of a given emitter/phototransistor pair at varying levels of blockage;

FIG. 13 is a voltage versus time graph illustrating a difference in output between photo-optic sets;

FIG. 14 is an exemplary time sample lookup table used in adjusting the sampling time of the duty-cycle encoding implemented by the present invention;

FIG. 15 is a quadrature state table that identifies the quadrature state change conditions the invention uses to indicate transitions in the position of an input wheel;

FIG. 16 is a quadrature state diagram corresponding to the quadrature state table of FIG. 15;

FIG. 17 is a logic diagram illustrating the logic used when performing a physical-to-logical quadrature conversion in the present invention;

FIG. 18 is a flow chart illustrating the logic employed by the present invention when providing duty-cycle control feedback and determining a physical quadrature detent position;

FIG. 19 is an event table related to the flow chart of FIG. 18; and

Figure 20:
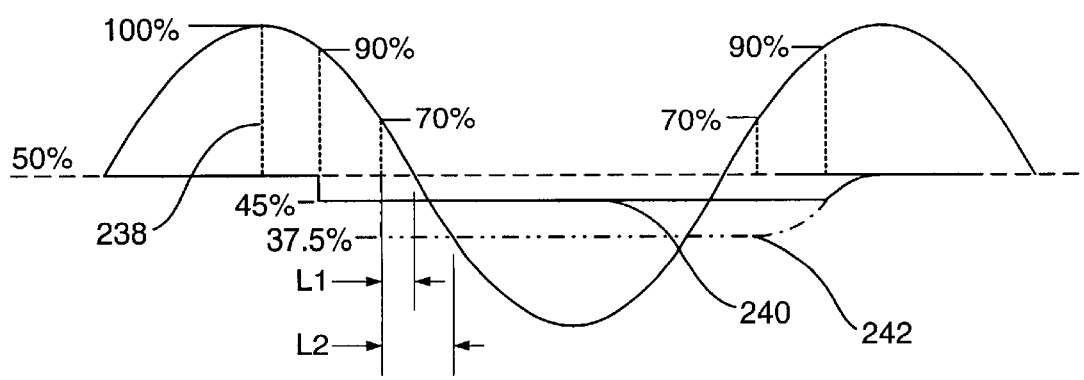

FIG. 20 is a graph of voltage output versus time illustrating the result of adjusting the duty-cycle time sampling when in a detented position.

DESCRIPTION OF THE PREFERRED EMBODIMENT

With reference to FIG. 9, functional blocks that are used in a system to generate encoder position data in accord with the present invention are illustrated. The system comprises three primary components, including a duty-cycle control block 100, a transition determination block 102, and a Z-wheel learning block 104. The duty-cycle control block includes a capture and process block 106, and a sample lookup table 108. The transition determination block comprises a physical-to-logical lookup 110 and a Z/Quad table 112. The input to this system are raw output signals produced by a pair of Schmitt triggers on respective channels A and B, as discussed above in the Background of the Invention. The system output is in the form of a data packet or packets 114, which contain information concerning a relative displacement of the Z-wheel, along with the state of control buttons on an input device in which the Z-wheel is included.

Duty-cycle control block 100 is used to translate the analog phototransistor/Schmitt trigger signals into respective digital channel inputs ZA and ZB. The output signal from a channel's Schmitt trigger will depend on how much of the path along which the collimated light produced by the LED propagates toward the channel's phototransistor is blocked by a codewheel tooth. As shown in FIG. 10, when the encoder wheel is rotated at a constant rate and the LED is continuously turned on, the voltages that are output by the phototransistors appear as sinusoidal waves 120 and 122, which correspond to the output on channels A and B, respectively. Ideally, the two sinusoidal waves will be 90° out of phase, as shown here. Also ideally, the Schmitt triggers will have a threshold voltage level 124 that is one-half of the peak-to-peak voltage 126 of the sinusoidal waves, such that the outputs of the Schmitt triggers are digital waveforms (square waves) similar to waveforms 128 and 130 shown in the figure.

Unfortunately, it is very unlikely that a given photo-optic set (LED, phototransistors, and Schmitt triggers) will produce the waveforms shown in FIG. 10. In actual devices, the threshold level may not be at the midpoint of the peak-to-peak voltage, the phase angle between channels may not be 90°, the output signals produced by the phototransistors may not be symmetric, etc. Therefore, a special type of encoding, hereinafter referred to as duty-cycle encoding, was developed to address these and other problems.

In the foregoing discussion of optical encoder principles, it was assumed that the LED and photo detectors were always turned on, which works fine for perfectly matched components, but is not a good assumption in the real world. When manufacturing large quantities of pointing devices, unmatched components will likely be used to minimize costs. However, there are some electronics principles that can be applied to the photodetection circuit of FIG. 4 to enable unmatched photo-optic components to produce quadrature waveforms that approach the ideal configuration shown in FIG. 10. In addition to the following discussion, further details concerning the control and processing of signals generated by photo-optic devices as applied in the duty-cycle encoding are disclosed in U.S. Pat. No. 5,256,913, the specification and drawings of which are hereby specifically incorporated herein by reference.

One electronics principle that is helpful in this case takes advantage of the behavior of a transistor when it is forced into an "off state" and then suddenly turned on. Although a phototransistor, should (ideally) produce an output that corresponds to the level of light it detects, the output of such devices cannot instantaneously slew to a steady state value. The following analogy is used to illustrate this principle.

Consider filling an empty bucket with water from a faucet. With reference to FIG. 11, the level of the height of the water in the bucket will start at 0, indicating that the bucket is empty, and increase over time until the bucket is filled, at which point the level will reach a peak, and the water will overflow. The steepness of the curve will depend on the flow rate of the water into the bucket from the faucet. If the faucet has a high volume flow, like that used to feed a fire hose, the curve from zero to "full" will be steep. However, it is not likely that a water source can fill the bucket instantaneously. In addition, the flow rate doesn't instantly change to a steady state value, and it is presumed that the flow rate is reduced just prior to the bucket becoming full.

In an analogous fashion, the phototransistors in FIG. 4 generate a charge of electrons, based on the intensity of light detected by the phototransistors, which "flow" as an electrical current to the Schmitt triggers. In accord with the preceding analogy, the LED is like the water supply, and the teeth (or slots between the teeth) of the codewheel are like the faucet that controls the rate at which water flows into the bucket. If the emitter light beam passes through the slots between the teeth, the phototransistor charges quickly. Conversely, if a wheel tooth blocks most of the light, the phototransistor charges very slowly. (Note that even if a phototransistor is completely blocked, it will still produce a certain minimum level of current called its "dark" current.) Ideally, the rate at which a phototransistor is charged should be proportional to the amount of the light beam that is blocked by a tooth. Furthermore, it is possible to "drain" the phototransistors (i.e., remove any charge present at their output) by momentarily coupling their outputs to ground, which in the analogy, is equivalent to opening a large drain hole in the bucket. The purpose of coupling the output signals to ground is to make sure the output signals produced by the phototransistors are initialized to a zero-charge (i.e., an empty bucket) condition.

FIG. 12 is a graph showing the voltage output by a given LED phototransistor pair versus time for different levels of blockage of light by the teeth of the codewheel. The various curves represent the voltage outputs corresponding to different rotational positions of the codewheel, wherein higher voltage curves 140, 142, 144, and 146 correspond to codewheel positions that only block a smaller portion of the light from being received by the phototransistor, while lower voltage curves 148, 150, and 152 correspond to codewheel positions that block a substantially greater portion of the light. For instance, curve 140 corresponds to a rotational position of the codewheel where none of the light directed toward the phototransistor is blocked by a tooth; in contrast, curve 152 corresponds to a rotational position in which a tooth is blocking almost all of the light directed toward the phototransistor.

In addition to variations in voltage output due to blockage, the voltage output versus time for an unblocked phototransistor will depend on the particular characteristics of each given photo-optic pair (i.e., LED-phototransistor combination), as shown in FIG. 13. The amount of time necessary for a given unblocked phototransistor to produce an output voltage level that crosses a threshold voltage $V_{th}$ will depend on the electrical characteristics of the phototransistor and its corresponding LED, i.e., the higher the sensitivity of the phototransistor (or more light produced by the LED), the less time will be required to cross the threshold. For instance, higher voltage curves 154 and 156 correspond to photo-optic pairs that include a relatively sensitive phototransistor and/or an LED that produces greater light output, while middle voltage curves 158, 160, and 162 correspond to photo-optic pairs with average sensitivity, and lower voltage curves 164 and 166 correspond to photo-optic pairs with relatively low sensitivity.

As discussed above with reference to FIG. 4, the phototransistor output voltage is applied to the input of a non-inverting Schmitt trigger, which has an internal threshold voltage (the same $V_{th}$ as above) such that the output from the Schmitt trigger is a "1" if the phototransistor voltage exceeds the threshold, and a "0" if the voltage is less than the threshold. Suppose an evaluation of the signal is made at some fixed time T after turning on the LED and draining the phototransistor. Ideally, if a wheel tooth is in the way, the output from the Schmitt trigger will be a 0, and if the wheel is not blocking or blocking very little light reaching the phototransistor, then the output from the Schmitt trigger will be a 1. If the wheel is moving and samples are repeatedly taken for every time interval T, a percentage of 1s versus 0s will be established. If the time T is well chosen, the ratio of 1s to 0s should be about 1:1. This balance of 1s and 0s will provide evenly-spaced quadrature states that are approximately equal in duration. As a result, it is less likely that a state change will be missed due to a short state transition.

The object of duty-cycle encoding is to control the time-sampling of the phototransistor outputs on each channel such that a sequence of quadrature bits (on each channel) are produced having a 50% duty cycle when the wheel is rotated at a constant velocity. This reduces the chance of quadrature states being missed. This object can be accomplished by finding an optimum time T in which to sample the output signals for a given set of photo-optics. The optimum time can be determined in part, by measuring the fastest threshold crossing time, called $T_{min}$, which corresponds to the time for the output voltage of a given set of photo-optics in which the phototransistors are completely uncovered to cross the threshold. The time for a half-covered photodetector signal to cross the threshold can then be estimated by doubling the value of $T_{min}$. This concept can then be extended to predict the amount of blockage present during a given sample. For instance, if samples are taken at intervals of $2T_m$, the output for a given set of photo-optics will be 1s when the photo detector is less than half covered and 0s when the photo detector is more than half covered, which results in the desired 50% duty cycle.

In summary, duty-cycle encoding in the present invention is accomplished by determining and reevaluating $T_{min}$ and taking samples of the outputs produced by the Schmitt triggers after $2T_{min}$ on a continuous basis. This process comprises repeatedly performing the steps of draining the photodetector outputs, releasing them to charge to a voltage level, turning on the LED, and reading the digital outputs produced by the Schmitt triggers after a delay of $2T_{min}$. As a result of implementing this process, a quadrature signal similar to that shown in FIGS. 3C and 10 is produced by combining the digital waveform outputs produced by the Schmitt triggers.

In order to determine the value for $T_{min}$, an initial value is set to a time after which all LED/phototransistor pairs are certain to cross the threshold (when no blockage exists). For the following discussion, this value will be chosen to be 50 microseconds ($\mu s$); the actual value will depend on the particular characteristic of the photo-optics that are used. Samples of the Schmitt trigger outputs are taken for 50 $\mu s$ at predetermined time intervals (e.g., 1 $\mu s$) after draining and releasing the phototransistors, and turning on the LED. These samples are then evaluated to determine the minimum amount of time required to reach the threshold voltage value for each sample.

In a preferred implementation, sampling of the outputs on the Schmitt triggers are continuously monitored on an ongoing basis to maintain an optimum value for $T_{min}$. For example, the process of draining the phototransistor outputs and cycling the LED on and off is repeated at fixed intervals, preferably every 160–250 $\mu s$. Rather than determining $T_{min}$ during every cycle, it is preferable that such determination be performed at predetermined longer intervals, such as every six to ten cycles. In this manner, $T_{min}$ can be reevaluated on an ongoing basis without undue processing overhead.

There are several benefits to determining $T_{min}$ in this manner. First, by monitoring for $T_{min}$ continuously (at predefined relatively short intervals), it is very likely that a $T_{min}$ value corresponding to a completely unblocked condition will be determined. As a user rotates the wheel, the amount of blockage caused by the codewheel teeth is constantly changing. Since the length of the sampling time is very small, a (nearly) instantaneous "snapshot" of the position of the teeth can be taken. By continuously taking such snapshots, it is more probable that one of the samples will be taken during a completely unblocked condition. For example, suppose that the voltage output for a particular set of photo-optics corresponds to the curves shown in FIG. 12, and that multiple samples are taken corresponding to respective $T_{min}$ values 168, 170, 172, 174, and 176. The minimum value for $T_{min}$ would thus be about 5 $\mu s$, corresponding to voltage curve 140 (the completely unblocked condition discussed above). This minimum value of $T_{min}$ is then stored as a baseline value for the set of photo-optics being sampled. As a result, since the value of $T_{min}$ can be tuned for each set of photo-optics, there is no longer a requirement that the components comprising the set of photo-optics be matched in order to obtain the desired results illustrated in FIG. 10.

Another benefit provided by this duty-cycle scheme is its ability to filter out random noise. Under many circumstances, it is possible that a random electrical glitch could cause the output of a Schmitt trigger to switch to a 1 too early, resulting in a calculated $T_{min}$ value that is too low. This might occur, e.g., if a user walked across a wool carpet, developing a substantial static voltage charge and touched the mouse, discharging the charge into the mouse circuitry, or if an electrical spike over the power line signal affected the supply voltage to the mouse. To compensate for such occurrences, the system has a mechanism for automatically increasing the length of $T_{min}$ (discussed below). If the previous value of $T_{min}$ (before it was increased) was valid, the system will quickly return $T_{min}$ back to this value. However, if $T_{min}$ was calculated to be too short due to an anomalous condition, subsequent determinations will set the time interval longer and longer until the proper time interval for $T_{min}$ is established. Additionally, the system prevents a single spike from causing $T_{min}$ to be set too short by requiring that the signal stay at a 1 for subsequent samples after $T_{min}$ before making $T_{min}$ any shorter. Under this circumstance, a signal that spikes to a 1 and but then quickly returns to a 0 is ignored.

It is preferable to adjust the value of $T_{min}$ in conjunction with the use of a lookup table (the Tsample lookup table), such as that shown in FIG. 14. This exemplary Tsample lookup table comprises a plurality of entries corresponding to output signals produced by photo-optic sets having a broad range of sensitivity levels. In this table, the $T_{sample}$ values are always twice the value of their corresponding $T_{min}$ value, (i.e., $2T_{min}$). In practice, the value of $T_{sample}$ may differ somewhat from $2T_{min}$, depending on the characteristic of the photo-optic components and the sampling method being used.

The table is implemented in the following fashion. Suppose that multiple samples have been taken, and the minimum value of $T_{min}$ is determined to be 9 $\mu s$. In this case, a row 178 corresponding to a sample #9 contains a $T_{min}$ value of 9 $\mu s$. Thus, the present value for $T_{sample}$ (the amount of elapsed time between when the phototransistors are released and samples of the Schmitt trigger outputs are taken to determine the present quadrature state) is 18 $\mu s$. Now, suppose the new value for $T_{min}$ determined from a subsequent set of samples is 10 $\mu s$, which is greater than the present value of $T_{min}$. Since $T_{min}$ ideally identifies a codewheel position of zero blockage, the sample corresponding to this new determination of $T_{min}$ must not have occurred at a zero-blockage position because the elapsed time to cross the threshold voltage is greater than the present value of $T_{min}$. Thus, this sample does not change the current value of Tmin, and $T_{min}$ remains at 9 $\mu s$.

In contrast to the foregoing case, suppose the minimum value of $T_{min}$ determined from a subsequent sample 6 $\mu s$, which is less than the present value of $T_{min}$. The value of $T_{min}$ is then updated to 6 $\mu s$. Optionally, rather than lowering $T_{min}$ to 6 $\mu s$ (and thus causing $T_{sample}$ to be set at 12 $\mu s$), the present position in the table is decremented by one, i.e., to sample #8, corresponding to a $T_{min}$ of 8 $\mu s$, and a $T_{sample}$ of 16 $\mu s$. In this manner, if the correct value of $T_{min}$ is actually 6 $\mu s$, subsequent decrements in the sample # position in the table will eventually reach this value. In addition, if the 6 $\mu s$ sample of $T_{min}$ was caused by a glitch, the present value of $T_{min}$ will change only slightly.

There is also a mechanism for forcing $T_{min}$ to be relearned. To accomplish object, a feedback signal is sent from the Z-Wheel learning block (see FIG. 9) to increment the present position of the sample # in the table. For example, if the present $T_{min}$ value corresponds to sample #9, a feedback signal from the Z-Wheel learning block will increment the sample # to sample #10, thereby setting $T_{min}$ to 10 µs and T$_{sample}$ to 20 µs. As discussed below, the Z-Wheel learning block sends feedback signals to the Tsample lookup table based on predefined specific actions or conditions, such as a user activation of a mouse button. If the actual value of T$_{min}$ is 9 µs, the sample # position in the table will be readjusted to sample #9 during subsequent evaluations of T$_{min}$, thereby causing the value of T$_{min}$ to be relearned. Additionally, if a glitch or other conditions, such as high ambient lighting conditions, causes T$_{min}$ to be too low, the feedback increments will eventually move T$_{min}$ back to its proper value.

Z/Quad Table

An important component of the system comprising the present invention is the Z/Quad table. The data comprising the Z/Quad table are shown in FIG. 15, with a corresponding state change diagram illustrated in FIG. 16. A primary difference between the Z/Quad table and the prior art table shown in FIG. 5A is that the Z/Quad table increases the number of electrical state changes per detent from 2 to 4, which makes it possible to narrow the range in which transition points are reported between detents. The Z/Quad table reports a transition (as indicated by the "output on change" column) when it determines that there has been a third electrical state change from a previous detent position. This approach allows each transition to be reported at a nominal value of 62.5% of the way between adjacent detents. With perfect (50%) duty-cycle control, no transition will be reported prior to reaching the 50% point. With perfect (90°) phase angle, no false transitions will be reported after the wheel is rotated 75% of the way to the next detent.

With reference to FIGS. 15 and 16, the "DR" (detent reverse) state identifies a detent position when moving in a reverse direction, and the "DF" (detent forward) state indicates a detent position when moving in a forward direction. Likewise, states 1R, 2R, and 3R correspond to state positions while moving in a reverse direction, while states 1F, 2F, and 3F correspond to state position while moving in a forward direction. (Hereinafter, a logic state will be indicated by (XX), and a physical state corresponding to the actual logic level values output by the duty-cycle encoding will be indicated by "XX.") All detent positions nominally correspond to "logical" electrical states on channels ZA and ZB of (11). The arrows in the state change diagram represent a movement from a given electrical state, such as (00), to a new electrical state. The electrical state pair near the root of a given arrow represents the new state to which the arrow points. Arrows that cross either the large "+" or "−" symbols in FIG. 16 represent a movement between a pair of state changes that result in a reported "+" or "−" transition, respectively. Transition reports are indicated in the "output on change" column in FIG. 15.

The Z/Quad table includes entries that correspond to both single state changes (i.e., when the electrical state of a single input channel changes (adjacent states in the diagram)), and when a single state change is missed. For example, a situation where a single state change is missed is shown in a row 178 of the table, which corresponds to a change from a detent position state DR (11) to a state 2R (00), since state 3R (10) has been missed.

When excluding any missed state changes, a reported "+" transition can only occur when moving in a forward direction from state 2F (00) to state 3F (10), as shown by an arrow 180 in the diagram of FIG. 16 and by entries in a row 182 of the table of FIG. 15. Similarly, when missed state changes are excluded, a reported "−" transition only occurs when moving in a reverse direction from state 2R (00) to state 1R (01), as shown by an arrow 184 in the diagram and by the entries in a row 186 of the table. This technique corresponds to conventional "1X" quadrature encoding, wherein a reported transition for a given rotation direction of the encoder is only reported upon recognition of a singular quadrature state change transition that has been predetermined for that direction, e.g., reporting a "+" transition whenever Channel A changes from low to high when rotating the encoder in a clockwise direction.

Since it possible that an electrical state change could be missed when traversing one of the two electrical state change pairs that correspond to the foregoing reported "+" and "−" transitions, the Z/Quad table provides entries to account for such occurrences so that proper transitions are reported, and false transitions are not reported. For example, suppose a user moves an encoder wheel forward from one detent to the next detent. The electrical states that (theoretically) will be traversed, and therefore should preferably be observed, are (sequentially) states DF→1F→2F→3F→DF. Under normal circumstances, a "+" transition change will be reported when the encoder detects a movement from state 2F to 3F (the predefined condition), as discussed above. However, it is possible that either of states 2F or 3F could be missed. If this situation isn't handled properly, a "+" transition change will not be reported, and the incremental scroll the user desired to invoke by moving the wheel forward one detent will not be performed.

In order to account for such missed state changes, the Z/Quad table includes entries that cover every combination of state changes where a single state change is missed. Furthermore, the table includes entries that report a transition even though one of the "normal" state changes was not sensed. For instance, suppose that during the previous wheel movement, the electrical state changes that were sensed were DF→1F-3F-DF (i.e., 2F was missed), as shown by an arrow 188, or DF→1F→2F→DF (i.e., 3F was missed), as shown by an arrow 190. These cases correspond to rows 192 and 194 of the Z/Quad table, respectively. In these cases, the entries in rows 192 and 194 indicate that a forward traversal between detents should be reported, even though one of the state changes that would normally be necessary to indicate such a transition is missing. The data in rows 196 and 198 correspond to similar situations when the wheel is moving in the reverse direction.

Physical-to-Logical Quad Conversion

As stated above, the detent position in the Z/Quad table corresponds to a "logical" input state on channels ZA and ZB of (11), which (ideally) represents the input generated by a device's photo-optics when the encoder wheel is in a detented position. However, due to manufacturing variances, there will be situations where the photo-optics for a given device will generate a physical input signal at a detent position that doesn't correspond to the logical detent position of (11). For example, a System A may produce a physical input of "10" when in a detented position, while a System B may produce an input of "01" when in a detented position. In order to implement the Z/Quad table, it is preferable that the table be programmed (hardcoded) into either the firmware of the system, or into a logic device, such as an application specific integrated circuit (ASIC) that processes the signals. However, it is not possible to hardcode in firmware a one-to-one mapping from the electrical quadrature signals (physical states) to the values in the Z/Quad state transition table for more than one detent state output. For example, the firmware cannot simultaneously accommodate both of Systems A and B, since System A should be in the DF (forward detent state) when the firmware sees (10), while System B should be in the DF state at (01). Therefore, the firmware needs to separate the physical quads, the quadrature input signals output on channels ZA and ZB, from the logical quads, the events or stimuli used by the firmware to decide which state it needs to go to and the corresponding action it needs to perform. This separation is performed by a physical-to-logical quad conversion scheme, which allows the system to adapt to physical variations in the optical encoder assemblies, while maintaining the functionality of the Z/Quad table. The conversion scheme allows the default detent electric states to be redefined, without requiring any changes to the executable firmware.

Referring to the Z/Quad table of FIG. 15 and assuming that the encoder is in a position to cause the firmware to sense a state DF, a quadrature event or stimulus of "01" causes the firmware to transition to state IF. This event is coded in the firmware state transition tables as a change of detent from (11) to (01) and can be accomplished through the use of three different schemes, which implement four tables, two tables, and a single table, respectively.

The simplest method of converting physical quads into logical quads is to implement four lookup tables having four entries each. There is one table for each of the possible physical quadrature input combinations corresponding to a detent position (i.e. a first table for a physical detent of "00", a second table for a physical detent of "01", a third table for a physical detent of "10", and a fourth table for a physical detent of "11"). While this method is sufficient, it requires more code to execute then either the two table or single table schemes described below.

The following describes in detail the techniques that are used in the two table and single table conversion schemes. The physical quads corresponding to a wheel that is turning in a forward direction are sequentially listed in TABLE 1.

TABLE 1

| Quadrature Input Signal Table |
| --- |
| A:B format |
| 01 |
| 00 |
| 10 |
| 11 |

TABLE 2 shows the index (i.e., offset, or position within the table) of the physical quad entries in TABLE 1.

TABLE 2

| Offset Table | |
| --- | --- |
| Quad Input | Offset in Table 1 (in binary) |
| 01 | 00 |
| 00 | 01 |
| 10 | 10 |
| 11 | 11 |

An algorithm can be used to map each logical quad to its corresponding physical quad by use of the offsets shown in TABLE 2.

To illustrate the algorithm, assume that the logical detent is (11) (i.e., the state DF is represented as a (11), and that the physical (electrical-mechanical) detent is "01".

| | |
| --- | --- |
| Index of Physical Detent "01" | = 00 (in binary) |
| Index of Logical Detent (11) | = 11 |
| Detent Offset = (Logical Index + Physical Index) modulo 4 | = 11 |

The following equations transform values from the physical domain to the logical domain:

Logical Quad Index=(Physical Quad Index+Detent Offset) modulo 4    (1)

Logical Quad=the value at position (Logical Quad Index) in TABLE 1    (2)

For example, if the electrical system sees a "00" signal (physical quad), the firmware performs the following calculations to obtain the corresponding logical quad:

Index of "00"=01

Detent Offset=11

Logical Quad Index=(01+11) modulo 4=00

Logical Quad=Table 2 index 00=(01)

One method of implementing the foregoing scheme in a firmware algorithm would be to use two tables, TABLE 1 and TABLE 2, Column 2. The following pseudo code is an example of a firmware implementation of the immediately preceding paragraph (i.e., converting a physical quad of "00" into its corresponding logical quad):

Index of "00": Lookup Table 2 Column 2 position 00 (return value="01")

Detent Offset: =11 (saved from the calculation above)

Logical Quad Index=(01+11) modulo 4=00

Logical Quad: Lookup Table 1 position 00 (return value ="01")

A closer examination of TABLES 1 and 2 reveals that a single lookup table can be used to perform the same function by using the offsets of the values stored in the table, as shown by TABLE 3 below.

TABLE 3

| |
| --- |
| 01 |
| 00 |
| 10 |
| 11 |

For example, entry "00" is the second entry in the table, and therefore has an offset of "01" in binary.

FIG. 17 shows the logic used by an algorithm that converts physical quads into logical quads using TABLE 3. The logic begins in a block 200, which sets the index equal to the physical quad value. Next, in a block 202, the index is used to look up the corresponding value in TABLE 3, which is used as a return value. The logical detent offset is then set to "11" in a block 204 (based on its predetermined default value). The logical quad index is then calculated in a block 206 by using the equation:

Logical Quad Index=(Return Value+Detent Offset) Modulo 4    (3)

The process is completed in a block 208, where the calculated logical quad index is used as the index in TABLE 3 to look up the logical quad value.

Repeating the exercise above (converting the physical quad (00) to its corresponding logical quad value) using the single table algorithm yields the following:

Index of "00": Lookup TABLE 3 position 00 (return value=01)

Detent Offset: =11 (saved by a previous operation)
Logical Quad Index=(01+1) modulo 4=00
Logical Quad: Lookup TABLE 3 position 00 (return value="01")

This single table implementation minimizes the code size, execution time, and table size required to perform the physical-to-logical quad conversion.

Alternatively to the firmware lookup table implementation(s), a simple hardware module consisting of only combinational logic can be used to map the physical states to the logical states. This is the preferred method if the algorithm is implemented as an ASIC (Application Specific Integrated Circuit). Written in HDL (Hardware Description Language), this module is a simple case statement that converts the physical Za and Zb inputs to the logical Za and Zb inputs, based on the current detent value. In this implementation, the logic will be reduced to its minimum form of combinational logic during logic synthesis.

Z-Wheel Learning Block

The Z-wheel learning block determines the physical inputs when the wheel is in a detent position and provides a feedback mechanism for readjusting the value of $T_{min}$, and controlling when the adjustment is made. In order for the system to behave properly, these two functions must be tied together.

The main function of the Z-wheel learning block is to determine what the values of ZA and ZB are while in a detent position (i.e., the physical quads at the detent position). The algorithm that performs this analysis is designed to be flexible so that if ambient conditions change or some other events such as electrostatic discharge (ESD), electronic fast transients (EFT), or varying ambient light (office or window lighting) confuse the system, it will recover.

In order to minimize any adverse effect on the pointing device system performance, the timing of this recovery is very important. Preferably, the recovery approach should not occur when the wheel is moving or just before the algorithm memorizes the current quads as the detent. If either of these events were to happen, the system could fail to report a Z count (i.e., a "+" or "−" transition) even though the wheel has been moved. For this reason, activation of the left (select) button has been selected as the triggering event for initiating the recovery process. In most instances, a user cannot push the left button while simultaneously beginning to scroll the wheel. It will of course be understood that either the left or the right buttons on a mouse can be chosen by the user to be the "select" button, but that the left button is the default select button.

The recovery method is accomplished by adjusting the duty-cycle control threshold level (by incrementing the sample # position in the Tsample table) each time the left button is depressed. With this approach, the mouse will recover from any extraordinary event that may have caused the mouse to learn its control parameters incorrectly. The key, as discussed above, is that the duty-cycle control algorithm can't be told to relearn just before the detent is learned or just as the wheel starts to move. The algorithm used in a preferred embodiment of the present invention accomplishes both of these goals.

With reference to FIGS. 18 and 19, the process begins in a block 210, where the system monitors data coming from the packets, looking for a Z count (a "+" or "−" transition indication) in a decision block 212. If no Z count is read, a decision block 214 checks to verify that the select mouse button has not been activated since the most recent cycle, by confirming that the select (assumed to be the left) button value (LB) of the current packet ([CP]) is up or the select button value of the last packet ([LP]) was down. If the answer is yes (no select button activated), the logic flows back to block 210 to begin again. Next, a decision block 216 determines whether the select-button value of the current packet is down, and the select-button value of the last packet was up, which would be the case if a user has pressed the select mouse button subsequent to the last packet evaluation. This situation (a user has activated the select mouse button with no Z count) signals that the photo-optics should be relearned, causing the logic to flow to a block 218, which increments the sample # position in the Tsample lookup table of FIG. 15 by 1. The process then repeats from the start.

If a Z count is detected, the logic flows to a block 220, which resets a 5-second timer that is used to determine whether the wheel has been at rest for more than 5 seconds. Optionally, other timer intervals besides five seconds can be used—the purpose of the timer interval is to provide an indication that the wheel has stopped rotating. Next, in a block 222, the system continuously monitors incoming Z-counts and the timer until a determination is made that there has not been a new Z-count received for more than 5 seconds, indicating that the wheel is stopped in a detented position. This determination is accomplished by a decision block 224, which checks for Z-counts, and a decision block 226, which evaluates the timer to see if it more than 5 seconds has elapsed. If a Z-count is detected in decision block 224, the logic flows back to block 220, which resets the timer, and the process to determine whether the wheel is stopped begins again at the start of block 222. If it is determined in decision block 226 that the timer has not reached 5 seconds, the logic flows back to the start of block 222.

The logic in block 222 is repeated until a determination is made in decision block 226 that the timer has overflowed, indicating that more than 5 seconds has elapsed since the last Z-count was received, thereby determining that the wheel has stopped moving and is in a detented position. In this instance, the logic flows to a decision block 228 to determine if the current quad value ([CQ]) is (00). If so, the logic flows back to block 210, and the process begins again. If the current quad value is not (00), a decision block 230 determines if the current quad value is unequal to the last quad value (LQ). If the answer is yes, the last quad is updated in a block 232 by setting the last quad value equal to the current quad value, and the logic flows back to the block 210 to begin again. If the answer to decision block 230 is no (i.e., the current quad and the last quad have the same value), the logic flows to a block 234, which updates the current detent by setting the current detent value (CD) equal to the last quad value. The logic then proceeds to block 232. In addition, the logic will never allow "00" to be set as the current detent. Furthermore, due to the design of the mechanical configuration between the photo-optic components, the physical "00" state will never correspond to a detent state. Instead, a mouse that stops in the "00" state for longer than five seconds is likely stopped on a balance point. In this way, the algorithm prevents the system from learning an incorrect detent state.

FIG. 19 shows a table for implementing the logic contained in the diagram of FIG. 16. For instance, the entries in a row 236 of the table indicate that if the current state is waiting for Z-counts, and a Z-count is received, the timer is reset.

The use of duty-cycle encoding in conjunction with the $T_{sample}$ lookup table and feedback mechanism provides several advantages over conventional optical encoder signal processing schemes. Since the system provides an adjustment mechanism for fine tuning to accommodate for variations in individual photo-optic sets, the desired 50% duty cycle can be readily achieved, resulting in output signals on Channels ZA and ZB that are substantially similar to the ideal quadrature signal waveforms shown in FIGS. 3C and 10 (when the input wheel is being turned at a constant rate). Furthermore, this scheme provides another advantage by adjusting the duty cycle while in a detent position such that the sensing of motion away from the detent position is enhanced.

Another advantage of relearning $T_{min}$ is shown in FIG. 20, which shows a typical sinusoidal signal corresponding to a raw phototransistor voltage output versus angular position as a codewheel is rotated between detent positions. Suppose that a maximum voltage occurs at an angle indicated by reference number 238. Under normal operation, the value of $T_{min}$ should correspond to a sample taken in close proximity to this angle, i.e., it should correspond to a sample taken when the output voltage is at a peak. With reference to the Tsample lookup table of FIG. 14, suppose this condition corresponds to sample #9. Now suppose that the signal voltage at a detent position is 90% of this maximum peak voltage. As discussed above, when a user activates a mouse select button while in a detent position (a common occurrence), a feedback signal is sent from the Z-wheel learning block to the duty-cycle control block so that the present sample # position is incremented by one. As a result, the value of $T_{sample}$ corresponding to the incremented sample # position will effectively lower the voltage threshold from 50% of a maximum peak-to-peak value, to approximately 50% of the peak-to-peak voltage level corresponding to the new sample # position. Assuming that the proper sample # was sample #9, an increment to sample #10 would increase $T_{sample}$ so that the effective threshold voltage would now be approximately 45% of the maximum peak-to-peak value, as shown by a step 240 in the threshold voltage. Additionally, consider that while it remains in a detent position, the codewheel does not move from its current position, resulting in a minimum elapsed threshold-crossing time corresponding to a subsequent set of samples that is greater than 9 µs (i.e., greater than the value of $T_{min}$ corresponding to the maximum peak-to-peak voltage point and the previous sample #9 position). As a result, the 10 µs value of $T_{min}$ corresponding to sample #10 will become the new value for $T_{min}$. The value of $T_{min}$ will revert back to its previous value (i.e., sample #9) when the wheel is rotated through another (or the same) maximum peak voltage position, returning the effective threshold voltage back to 50% of the peak-to-peak voltage.

The benefit of this feature is further illustrated by considering a case where the output voltage at a detent is 70% of the maximum voltage. While remaining in a detent position, after a first select-button activation, the sample # would be incremented to sample #10, after a second activation, the sample# would be incremented to a sample #11, and after a third activation, the sample number would be incremented to sample #12. This sequence would increase $T_{sample}$ to 24 µs, thereby effectively reduce the threshold voltage to approximately 37.5% (¾₁₂ of 50%) of the maximum peak-to-peak value, as shown by a step 242 in the threshold voltage. As with the foregoing case, the value of $T_{min}$ should remain at 12 µs (corresponding to sample #12), since the wheel remains in a detent position where the maximum voltage is 70% of the peak-to-peak voltage. As a result, an effective new threshold voltage is established such that the distance between the present detent position and the angular position that crosses the threshold voltage is increased from L1 to L2.

This signal processing also is beneficial in reducing the effect of noise. As discussed above, the system provides a feedback signal to relearn $T_{min}$ whenever the select mouse button is activated and the wheel is not moving. As a result, a new $T_{min}$ value will quickly be established corresponding to the voltage outputs produced at a detent position. Thus, in the event that a determined value of $T_{min}$ is too low due to an electrical spike, etc., the value of $T_{min}$ will be quickly adjusted to a more accurate value after a few mouse clicks.

The signal processing performed by the duty-cycle control block, transition determination block, and a Z-wheel learning block provides for a very robust Z-wheel position determination system. This system is able to discern between valid transition conditions and invalid conditions due to electrical noise or other anomalies, as well as determine when a user has moved the wheel from one detent position to another detent position, even in the event of a missed electrical state change. The system is also able to reduce improper transition reporting by requiring that there be three electrical state changes out of a detent position prior to reporting a movement to an adjacent detent position.

The foregoing description of the preferred embodiment of the invention is not meant to limit the use of the invention to a mouse or similar computer input device. Rather, a scheme based on the principles discussed above and shown in the drawings could be applied to any device that uses a detented wheel as an input axis. In addition, an appropriately programmed logic device, such as an ASIC, may be substituted for the microcontroller (and its associated firmware) for implementing the Z/Quad table and performing the physical-to-logical conversion process, or a combination of an ASIC and microcontroller may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for detecting a change in a detent position of a detented wheel operatively coupled to an optical encoder that produces a quadrature output signal comprising a first, a second, a third, and a fourth quadrature state as the detented wheel is rotated in a forward or a reverse direction between successive detented positions, the method comprising the steps of:

(a) monitoring and processing the quadrature output signal from the optical encoder as the detented wheel is rotated, the quadrature output signal that is processed comprising a plurality of successive quadrature states;

(b) defining quadrature state change conditions that invoke position change indications corresponding to a change in the detent position, such that in each of the forward and reverse directions, there exists a single predefined quadrature state change condition between a predefined pair of adjacent quadrature states that invokes a position change indication corresponding to the direction, the quadrature state change conditions compensating for a missing quadrature-state change in detecting a change in detent position; and (c) outputting position change indications based on changes between successive quadrature states and the quadrature state change conditions that are defined, so as to provide an indication of the rotation direction and an amount of rotation of the detented wheel.

2. The method of claim 1, wherein the step of defining the quadrature state change conditions comprises the step of creating a quadrature state table that comprises a plurality of entries defining the quadrature state change conditions.

3. The method of claim 2, wherein each entry in the quadrature state table comprises a state change between one of the first, second, third, or fourth quadrature states and another quadrature state and includes an indication of whether the quadrature state change corresponds to the forward or the reverse direction of wheel rotation, the single predefined quadrature state change condition invoking a position change indication for the forward direction when a change between the second quadrature state and the third quadrature state occurs, the quadrature state table further including entries indicating a position change in the forward direction compensating for missed quadrature state changes such that a position change in the forward direction is indicated when the quadrature state changes from the second quadrature state to the fourth quadrature state or from the first quadrature state to the third quadrature state.

4. The method of claim 2, wherein each entry in the quadrature state table comprises a state change between one of the first, second, third, or fourth quadrature states and another quadrature state and includes an indication of whether the quadrature state change corresponds to the forward or the reverse direction of wheel rotation, the single predefined quadrature state change condition invoking a position change indication for the reverse direction when a change between the second quadrature state and the first quadrature state occurs, the quadrature state table further including entries indicating a position change in the reverse direction compensating for missed quadrature state changes such that a position change in the reverse direction is indicated when the quadrature state changes from the third quadrature state to the first quadrature state or from the second quadrature state to the fourth quadrature state.

5. The method of claim 3, wherein the fourth quadrature state corresponds to the quadrature output signal that was processed when the detented wheel is in a detent position.

6. The method of claim 4, wherein the fourth quadrature state corresponds to the quadrature output signal that was processed when the detented wheel is in a detent position.

7. The method of claim 2, wherein the quadrature output signals from the optical encoder that are monitored and processed comprise physical quadrature states and the plurality of entries in the quadrature state table defining the quadrature state change conditions comprise logical quadrature states, and wherein the optical encoder outputs a detent physical quadrature state when the detented wheel is in a detent position, further including the steps of:
(a) determining to which of the first, second, third, or fourth quadrature states the detent physical quadrature state corresponds; and
(b) converting from the physical quadrature state to a logical quadrature state so that when the detented wheel is rotated between adjacent detent positions, a position change indication is output within a predefined range of rotation relative to the adjacent detent positions.

8. The method of claim 7, wherein when the detented wheel is rotated from a detent position, a position change indication is output indicating a change to an adjacent detent position after three logical quadrature state changes are traversed.

9. The method of claim 7, wherein the step of determining to which of the first, second, third, or fourth quadrature states the detent physical quadrature state corresponds comprises the steps of:
(a) determining an elapsed time between successive quadrature state changes, and
(b) if the elapsed time exceeds a predetermined threshold, setting the detent physical quadrature state equal to an immediately preceding quadrature state.

10. The method of claim 7, wherein the step of converting from the physical quadrature states to the logical quadrature states is implemented through the use of a lookup table.

11. The method of claim 10, wherein the lookup table lists the four quadrature states, each quadrature state having an index value based on a location of that quadrature state within the list, and the lookup table defines a logical detent quadrature state, wherein the step of converting from physical quadrature states to logical quadrature states further comprises the steps of:
(a) setting an index lookup equal to the physical detent quadrature state;
(b) identifying a quadrature state in the lookup table having an index value equal to the index lookup;
(c) determining a detent index of the quadrature state in the lookup table corresponding to the logical detent quadrature state;
(d) determining a logical quadrature index as a function of the quadrature state that was identified and the detent index;
(e) identifying the quadrature state in the lookup table having an index value equal to the logical quadrature index; and
(f) setting the logical quadrature state equal to the quadrature state that was identified in the preceding step.

12. The method of claim 1, wherein the optical encoder comprises a pair of optical sensors, each of which produces an output voltage that varies based on the position of the detented wheel, and wherein the quadrature output signal is obtained through a duty-cycle algorithm that includes the steps of:
(a) periodically resetting the output voltage produced by each optical sensor;
(b) sampling the output voltage of each optical sensor after a predetermined sampling time to determine if the output voltage that was sampled exceeds a predetermined voltage threshold;
(c) producing a pair of quadrature bits, one for each optical sensor, each quadrature bit having a logic level that is a function of whether the output voltage of its corresponding optical sensor exceeds the predetermined voltage threshold, the pair of quadrature bits comprising one of the first, second, third and fourth quadrature states; and
(d) repeating steps (a)–(c), thereby generating a sequence of pairs of quadrature bits comprising the quadrature output signal.

13. The method of claim 12, wherein the duty-cycle algorithm further comprises the step of determining an optimal sampling time for at least one of the optical sensors such that the quadrature bits produced by said at least one optical sensor have approximately a 50% duty cycle when the detented wheel is rotated at a constant rate.

14. The method of claim 13, wherein the duty-cycle algorithm includes the step of determining an optimal sampling time by:
(a) sampling a digital waveform on one of the respective channels to determine a minimum elapsed time necessary to produce a voltage output that exceeds the threshold voltage; and (b) determining the optimal sampling time as a function of the minimum elapsed time.

15. The method of claim 14, wherein the optimal sampling time is approximately twice the minimum elapsed time.

16. The method of claim 14, wherein the duty cycle algorithm further comprises the steps of:

(a) periodically determining the minimum elapsed time; and (b) adjusting the optimal sampling time if a change in the minimum elapsed time is detected.

17. The method of claim 16, wherein the duty-cycle algorithm further comprises the steps of:

(a) storing a current minimum elapsed time setting; and (b) increasing the current minimum elapsed time setting in response to a predefined user control action, thereby causing a corresponding increase in the optimal sampling time.

18. The method of claim 16, wherein the duty-cycle control algorithm further comprises the steps of:

(a) defining a time sample lookup table comprising a plurality of entries associating minimum elapsed times with corresponding optimal sampling times; and (b) determining the optimal sampling time by determining a minimum elapsed time and identifying its associated optimal sampling time in the sample lookup table.

19. The method of claim 18, wherein the plurality of entries in the time sample lookup table are ordered.

20. The method of claim 19, wherein the time sample lookup table comprises a current position corresponding to a previously increased minimum elapsed time, and wherein the duty-cycle algorithm further comprises the steps of:

(a) determining whether a new minimum elapsed time is less than the previously increased minimum elapsed time; and (b) if the new elapsed time is less than the previously increased minimum elapsed time, changing the current position in the time sample lookup table to a position in which the minimum elapsed time is decreased, causing a corresponding decrease in the optimal sampling time.

21. A user input control comprising:

(a) a detented wheel rotatable by a user in a forward and a reverse direction, between successive detented positions;

(b) an optical encoder, operatively coupled to sense a rotation of the detented wheel, said optical encoder comprising:

(i) an optical detector that produces a quadrature output signal comprising a first, a second, a third, and a fourth quadrature state;

(ii) a codewheel that is coupled to and rotated with the detented wheel, said codewheel comprising a plurality of radially-extending, spaced-apart regions that transmit an optical signal as they pass through the optical detector when the detented wheel is turned, quadrature states of the quadrature output signal indicating rotational positions of the codewheel as the regions are rotated past the optical detector;

(c) a support on which the detented wheel and optical encoder are mounted;

(d) a memory storing a quadrature state table defining quadrature state change conditions that invoke position change indications corresponding to a change in a detent position, such that in each of the forward and reverse directions, there exists a single predefined quadrature state change condition between a predefined pair of adjacent quadrature states that invokes a position change indication corresponding to the direction, the quadrature state change conditions compensating for a missing quadrature-state change in detecting a change in detent position; and (e) a logic device, coupled to the memory and programmed to perform the functions of:

(i) receiving and processing the quadrature output signal from the optical encoder, the processed quadrature output signal comprising a plurality of successive quadrature states; and (ii) outputting position change indications based on changes between successive quadrature states and the quadrature state change conditions that are defined in the quadrature state table, so as to provide an indication of the rotation direction and a number of detented position traversed during the rotation of the detented wheel.

22. The user input control of claim 21, wherein each entry in the quadrature state table comprises a state change between one of the first, second, third, or fourth quadrature states and another quadrature state and includes an indication of whether the quadrature state change corresponds to the forward or the reverse direction of wheel rotation, the single predefined quadrature state change condition invoking a position change indication for the forward direction when a change between the second quadrature state and the third quadrature state occurs, the quadrature state table further including entries indicating a position change in the forward direction compensating for missed quadrature state changes such that a position change in the forward direction is indicated when the quadrature state changes from the second quadrature state to the fourth quadrature state or from the first quadrature state to the third quadrature state.

23. The user input control of claim 21, wherein each entry in the quadrature state table comprises a state change between one of the first, second, third, or fourth quadrature states and another quadrature state and includes an indication of whether the quadrature state change corresponds to the forward or the reverse direction of wheel rotation, the single predefined quadrature state change condition invoking a position change indication for the reverse direction when a change between the second quadrature state and the first quadrature state occurs, the quadrature state table further including entries indicating a position change in the reverse direction compensating for missed quadrature state changes such that a position change in the reverse direction is indicated when the quadrature state changes from the third quadrature state to the first quadrature state or from the second quadrature state to the fourth quadrature state.

24. The user input control of claim 22, wherein the fourth quadrature state corresponds to the quadrature output signal that was processed when the detented wheel is in a detent position.

25. The user input control of claim 23, wherein the fourth quadrature state corresponds to the quadrature output signal that was processed when the detented wheel is in a detent position.

26. The user input control of claim 21, wherein the quadrature output signals from the optical encoder that are monitored and processed comprise physical quadrature states and the plurality of entries in the quadrature state table defining the quadrature state change conditions comprise logical quadrature states, and wherein the optical encoder outputs a detent physical quadrature state when the detented wheel is in a detent position, said logic device further implementing the functions of:

(a) determining to which of the first, second, third, or fourth quadrature states the detent physical quadrature state corresponds; and (b) converting from the physical quadrature state to a logical quadrature state so that when the detented wheel is rotated between adjacent detent positions a position change indication is output within a predefined range of rotation relative to the adjacent detent positions.

27. The user input control wheel of claim 26, wherein the function of determining to which of the first, second, third, or fourth quadrature states the detent physical quadrature state corresponds comprises the functions of:

(a) determining an elapsed time between successive quadrature state changes, and (b) if the elapsed time exceeds a predetermined threshold, setting the detent physical quadrature state equal to an immediately preceding quadrature state.

28. The user input control of claim 26, wherein the memory stores a lookup table and wherein the lookup table lists the four quadrature states, each quadrature state having an index value based on a location of that quadrature state within the list, and the lookup table defines a logical detent quadrature state, wherein when converting from physical quadrature states to logical quadrature states the logic device further implements the functions of:

(a) setting an index lookup equal to the physical detent quadrature state;

(b) identifying a quadrature state in the lookup table having an index value equal to the index lookup;

(c) determining a detent index of the quadrature state in the lookup table corresponding to the logical detent quadrature state;

(d) determining a logical quadrature index as a function of the quadrature state that was identified and the detent index;

(e) identifying the quadrature state in the lookup table having an index value equal to the logical quadrature index; and (f) setting the logical quadrature state equal to the quadrature state that was identified in the preceding function.

29. The user input control of claim 21, wherein the optical detector in the optical encoder comprises a pair of optical sensors, each of which produces a resettable voltage output that increases with time up to a limiting value based on the position of the detented wheel, and wherein the logic device implements a duty-cycle algorithm that enables the logic device to reset and control a sampling of the voltage output of each optical sensor after a sampling time to determine a logic level comprising a quadrature bit based on whether the sampled output voltage exceeds a threshold voltage, thereby producing a pair of quadrature bits, each pair of quadrature bits produced during a given sampling time comprising one of the first, second, third, and fourth quadrature states, whereby an ongoing execution of the duty-cycle algorithm produces a sequence of quadrature states comprising the quadrature output signal.

30. The user input control of claim 29, wherein the logic device determines an optimal sampling time for at least one of the optical sensors such that the quadrature bits produced by said at least one optical sensor have approximately a 50% duty cycle when the detented wheel is rotated at a constant rate.

31. The user input control of claim 30, wherein the logic device determines the optimal sampling time by performing the functions of:

(a) sampling a digital waveform on one of the respective channels to determine a minimum elapsed time necessary to produce a voltage output that exceeds the threshold voltage; and (b) determining the optimal sampling time as a function of the minimum elapsed time.

32. The user input control of claim 31, wherein the optimal sampling time is approximately twice the minimum elapsed time.

33. The user input control of claim 31, wherein the minimum elapsed time is determined on a continuing basis, causing an adjustment of the optimal sampling time if a change in the minimum elapsed time is detected.

34. The user input control of claim 33, wherein a current minimum elapsed time setting is stored in the memory, the current minimum elapsed time setting being increased in response to a predefined user control action, thereby causing a corresponding increase in the optimal sampling time.

35. The user input control of claim 33, wherein the memory includes a time sample lookup table comprising a plurality of entries associating minimum elapsed times with corresponding optimal sampling times, and wherein the optimal sampling time is determined by determining a minimum elapsed time and identifying its associated optimal sampling time in the sample lookup table.

36. The user input control of claim 35, wherein the plurality of entries in the time sample lookup table are ordered.

37. The user input control of claim 36, wherein the time sample lookup table comprises a current position corresponding to a previously increased minimum elapsed time, and wherein if upon a subsequent determination of the minimum elapsed time, a current value of the minimum elapsed time is determined that is less than the previously increased minimum elapsed time, then the current position in the sample lookup table changes to a position in which the minimum elapsed time is decreased, causing a corresponding decrease in the optimal sampling time.

* * * * *